US011138584B1

(12) United States Patent
Catoe et al.

(10) Patent No.: US 11,138,584 B1
(45) Date of Patent: *Oct. 5, 2021

(54) SYSTEM AND METHOD FOR SELF-CHECKOUT, SCAN PORTAL, AND PAY STATION ENVIRONMENTS

(71) Applicant: ECR Software Corporation, Boone, NC (US)

(72) Inventors: Peter Terry Catoe, Boone, NC (US); Mark Noble, Boone, NC (US); John L. White, Boone, NC (US); Burt Aycock, Boone, NC (US); Claire McRoberts, Boone, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,228

(22) Filed: Aug. 13, 2020

Related U.S. Application Data

(60) Continuation of application No. 15/637,207, filed on Jun. 29, 2017, now Pat. No. 10,762,485, which is a
(Continued)

(51) Int. Cl.
*G06Q 20/20* (2012.01)
*G06Q 20/18* (2012.01)
(Continued)

(52) U.S. Cl.
CPC ........... *G06Q 20/208* (2013.01); *G06N 20/00* (2019.01); *G06Q 20/18* (2013.01); *G06Q 20/20* (2013.01);
(Continued)

(58) Field of Classification Search
CPC ...... G06Q 20/208; G06Q 20/20; G06Q 20/18; G07G 1/0054; G07G 1/0036; G07G 1/14; G06N 20/00; G06F 3/017; G06F 3/167
See application file for complete search history.

(56) References Cited

U.S. PATENT DOCUMENTS

| 6,408,279 B1 * | 6/2002 | Mason | ..................... A47F 9/047 235/383 |
| 7,246,745 B2 | 7/2007 | Hudnut et al. | ................. 235/383 |

(Continued)

FOREIGN PATENT DOCUMENTS

EP 0663643 1/1989

OTHER PUBLICATIONS

Kahl et al. IRL SmartCart—a user-adaptive context-aware interface for shopping assistance. In Proceedings of the 16th international conference on Intelligent user interfaces (IUI '11). Association for Computing Machinery, New York, NY, USA, 359-362. 2011 (Year: 2011).*

(Continued)

*Primary Examiner* — Nathan A Mitchell
(74) *Attorney, Agent, or Firm* — MacCord Mason PLLC

(57) ABSTRACT

A checkout system includes a checkout station having a housing, a customer interface and a customer unloading station. A point-of-sale system has a microprocessor and memory operatively associated with one another to identify products being purchased, payments tendered therefor and to store transaction information locally at the checkout station or remotely from the checkout station. The microprocessor has programming configured to allow an item to be scanned by a product identification scanner, and an attendant command module.

20 Claims, 21 Drawing Sheets

Related U.S. Application Data continuation of application No. 15/425,182, filed on Feb. 6, 2017, now Pat. No. 10,248,942, which is a division of application No. 14/046,254, filed on Oct. 4, 2013, now Pat. No. 9,595,029.

(60) Provisional application No. 61/751,603, filed on Jan. 11, 2013, provisional application No. 61/709,487, filed on Oct. 4, 2012.

(51) Int. Cl.
   *G07G 1/00* (2006.01)
   *G07G 1/14* (2006.01)
   *G06N 20/00* (2019.01)
   *G06F 3/16* (2006.01)
   *G06F 3/01* (2006.01)

(52) U.S. Cl.
   CPC ......... *G07G 1/0036* (2013.01); *G07G 1/0054* (2013.01); *G07G 1/14* (2013.01); *G06F 3/017* (2013.01); *G06F 3/167* (2013.01)

(56) References Cited

U.S. PATENT DOCUMENTS

| | | | |
|---|---|---|---|
| 7,337,960 B2 | 3/2008 | Ostowski et al. | 235/383 |
| 7,387,241 B2 | 6/2008 | Hassenbuerger | 235/383 |
| 7,909,248 B1 | 3/2011 | Gonclafes | 235/383 |
| 8,459,558 B2 | 6/2013 | Baitz | 235/470 |
| 8,556,181 B2 | 10/2013 | Twiste | 235/470 |
| 8,627,946 B2 | 1/2014 | Bait et al. | 198/502.2 |
| 9,595,029 B1 | 3/2017 | Catoe et al. | 20/18 |
| 10,248,942 B1 | 4/2019 | Catoe | |
| 2002/0056750 A1 | 5/2002 | Kato et al. | 235/454 |
| 2004/0083170 A1 | 4/2004 | Bam et al. | 705/40 |
| 2006/0283943 A1 | 12/2006 | Ostrowski et al. | 235/383 |
| 2007/0205277 A1* | 9/2007 | Tashiro | G07G 3/006 235/383 |
| 2008/0000975 A1 | 1/2008 | Hejl et al. | 235/454 |
| 2008/0027817 A1* | 1/2008 | Iizaka | G07G 3/006 705/20 |
| 2008/0110724 A1 | 5/2008 | Twiste | 198/620 |
| 2009/0039164 A1 | 2/2009 | Herwig et al. | 235/462.41 |
| 2009/0171801 A1* | 7/2009 | Ryo | G06F 3/04895 705/23 |
| 2011/0057035 A1* | 3/2011 | Matsuhisa | G07G 1/0054 235/383 |
| 2011/0259952 A1* | 10/2011 | Yamada | G07G 1/0054 235/375 |
| 2012/0187194 A1* | 7/2012 | Svetal | G06G 1/0063 235/470 |
| 2012/0187195 A1 | 7/2012 | Actis et al. | 235/479 |
| 2012/0205448 A1 | 8/2012 | Hoskinson et al. | 235/440 |
| 2013/0020392 A1* | 1/2013 | Olmstead | G07G 1/0063 235/440 |
| 2013/0254044 A1* | 9/2013 | Catoe | G06Q 20/208 705/16 |
| 2013/0328682 A1* | 12/2013 | Shearin | G06K 7/1096 340/572.3 |
| 2014/0353115 A1* | 12/2014 | Baitz | B65G 47/48 198/340 |

OTHER PUBLICATIONS

McMillin, Kevin. Universally-Designed Grocery Self-Checkout Systems. Retrieved from <http://www.kevin.mcmill.in/does/factors-final-paper.pdf>. Dec. 2011. (Year: 2011).*

SCDigest, "High Speed UPC Scan Tunnel at Heart of New Advantage Checkout System; Reducing Billions of Touches Annually; Bearish Bet on RFID in Grocery; What Will Kroger Do?." http://www.scdigest.com/ontarget/11-01-11-2.php?cid=4083&ctype=content, Jan. 11, 2011. (Year: 2011).*

* cited by examiner

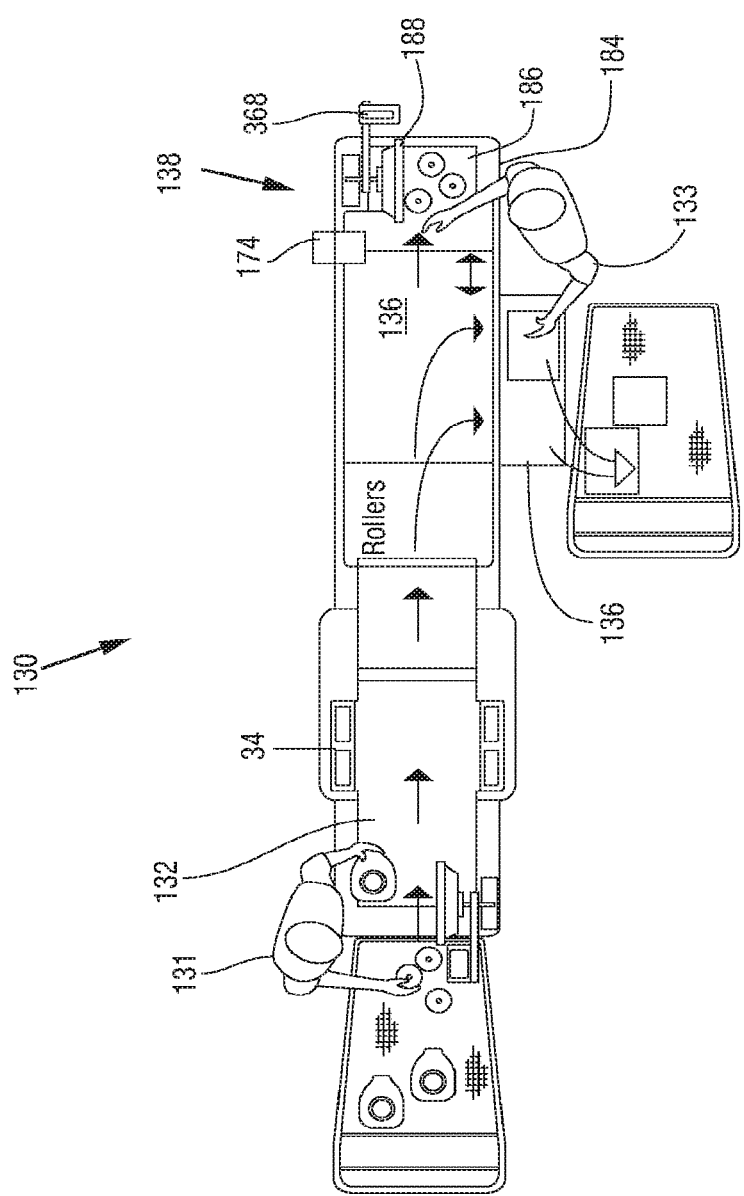

SYSTEM AND METHOD FOR SELF-CHECKOUT, SCAN PORTAL, AND PAY STATION ENVIRONMENTS

This application is a continuation of application Ser. No. 15/637,207 filed Jun. 29, 2017, a continuation of application Ser. No. 15/425,182 filed Feb. 6, 2017, a divisional of application Ser. No. 14/046,254 filed Oct. 4, 2013, which claims the benefit of Application Ser. No. 61/751,602 filed Jan. 11, 2013 and 61/709,487 filed Oct. 4, 2012.

BACKGROUND

The present invention relates generally to checkouts, automated self-checkouts, scan portals and pay station environments, and more particularly to systems and methods for increased speed and efficiency at checkouts, self-checkouts, scan portals and pay station environments.

In a retail type environment, the efficiency with which consumers are able to process, pay for and purchase their desired items factors into the expenses for a retail type establishment. The labor hours attributable to manning checkout counters contribute greatly to this expense. In a typical retail operation, a shopper gathers the items desired for purchase and presents them at a checkout counter, a clerk then scans or enters the items' barcodes and the point-of-sale (POS) system totals the shopper's bill. The clerk may apply any promotional discounts to the bill, the shopper tenders payment, and the items may be bagged for the shopper or customer. A number of self-service automated checkout terminal concepts have been developed in an attempt to reduce the need for a check-out clerk, thus reducing associated labor costs.

Toward reducing operating expenses, some businesses have implemented self-checkout counters. Self-checkout terminals are systems which are operated mainly by a customer without the direct aid of a checkout clerk. In such a system, the customer selects individual items for purchase, scans them across a scanner or screen and then places the selected items into a grocery type bag, if desired. This continues iteratively for the remainder of the items to be purchased. The customer then generally pays for his or her purchase at the self-service checkout terminal. Thus, a traditional self-service checkout terminal permits a customer to select, ring up and pay for his or her purchases without the direct assistance of the retailer's personnel at each individual checkout terminal. One attendant may attend to transaction problems at several checkouts.

Self-checkout systems are also useful in other types of unattended environments, such as, employee break rooms, hotel vending areas, business lobby settings or hospitals. One of the many benefits of self-checkout systems is that they allow quick consumer-operated transactions, resulting in high throughput. This high throughput has to be balanced with a transaction that allows new self-checkout users to feel in control of and comfortable with the transaction.

As there is a move toward utilization of the self-checkout, there is also a move to improve the self-checkout process and to address problems arising with the use of more self-checkouts by consumers. Generally, self-checkouts are utilized by consumers with a fairly small number of checkout items. More customers using the self-checkouts may mean longer lines, so maximizing the speed of operation of the self-checkout becomes all the more important. Minimizing the number of times the items for purchase are handled, or the attention time devoted to each item, adds to the speed of the transaction.

In efforts to improve the traditional checkout and self-checkout, hybrid checkout scenarios are being created, where technologies such as scan tunnels and paystations create a checkout that is not the traditional fully attended checkout and is not the unattended self-checkout. Scan tunnel technology has been introduced that allows the consumer to place the items to be purchased on a conveyor belt. The conveyor belt carries the items through a scan tunnel that automatically scans the items, relieving the consumer and/or attendant of this responsibility. Consumers no longer need to scan each item and attendants are freed up to assist with bagging the purchased items and attending to exceptions occurring during the checkout process. Exceptions are delays to the transaction, such as for example, verifying the customers age in the purchase of an alcoholic beverage or tending to an item that did not scan properly.

In one example, centralized pay stations allow consumers to swiftly move through a transaction at a checkout and then for several checkout stations to be serviced by one pay station. One attendant can manage the pay station, freeing other attendants to focus on bagging and exception handling. While these advancements in checkout stations increase speed and throughput, Applicant foresees that other challenges are being created by the hybrid checkout environments.

Attendant's responsibilities in scan tunnel (also known as "portal scanner") scenarios involve two major functions: 1) bagging items and 2) handling exceptions. These functions will occur rapidly and in higher volume during most transactions than previously experienced with more traditional self-checkouts. Traditionally, brick-and-mortar retail transactions do not require front-end store employees to multi-task in the manner described above for the scan tunnel scenario. The traditional, staffed point-of-sale paradigm may have either a single cashier who scans first, then bags later, in a serial fashion, or may have both a cashier and a bagger. In either point-of-sale scenario, the level of multi-tasking described above is not required because the interaction with the system (scanning items, handling exceptions) and bagging are temporally and spatially separated, whether they are done by one employee or by two employees.

In self-checkout environments, the attendant may be required to assist with scanning items, handle exceptions, and bag items. However, the exception handling is typically limited to a single item that is also addressed in a sequence and does not involve the bagging of multiple items in rapid succession. The attendant usually only addresses the item that causes the one exception, and the consumer will bag all other items. The hybrid checkout places both the consumer and attendant into new roles at the checkout. Applicant's inventions address these and other challenges in the art and are directed to a new method and system for improving the customer experience at checkout terminals, for example, traditional checkout and self-checkout terminals and hybrid terminals.

SUMMARY

The present invention fulfills one or more of these needs in the art by providing systems and methods for increased speed and efficiency at checkout, self-checkout and hybrid checkout systems, for example, in scan portals and pay station environments. Some improvements may be equally beneficial at traditional checkout and self-checkout environments.

Accordingly, one aspect of the invention is to provide a checkout system including a checkout station, a point-ofsale system having a microprocessor and memory operatively associated with one another, and an attendant command module. The system may further include a portal scanner.

In another example, the invention includes a checkout apparatus including a base with a customer interface, a scan tunnel and an attendant interface. The customer interface and attendant interface are spaced apart by the scan tunnel. Also included is a transport mechanism extending from the customer interface, through the scan tunnel and to the attendant interface so that a customer may load items for purchase on the base at the customer interface. The transport mechanism transports the loaded items through the scan tunnel to the attendant interface. The scan tunnel is equipped with transducers to read information about the loaded items as they pass through the scan tunnel and deliver digital electronic signals indicating the read information to assist in compiling a digital list of items the customer has chosen to purchase. Further included may be a defined location for the attendant and a digital attendant identification file including information about the attendant's arm-reach. The area of the attendant interface is typically defined, at least in part, by the extent of the attendant's arm-reach.

These and other aspects of the present invention will become apparent to those skilled in the art after a reading of the following description of the preferred embodiment when considered with the drawings.

BRIEF DESCRIPTION OF THE FIGURES

FIG. 2A is a top view of one example of a hybrid checkout including a scan tunnel environment;

DESCRIPTION OF THE PREFERRED EMBODIMENTS

Figure 1:
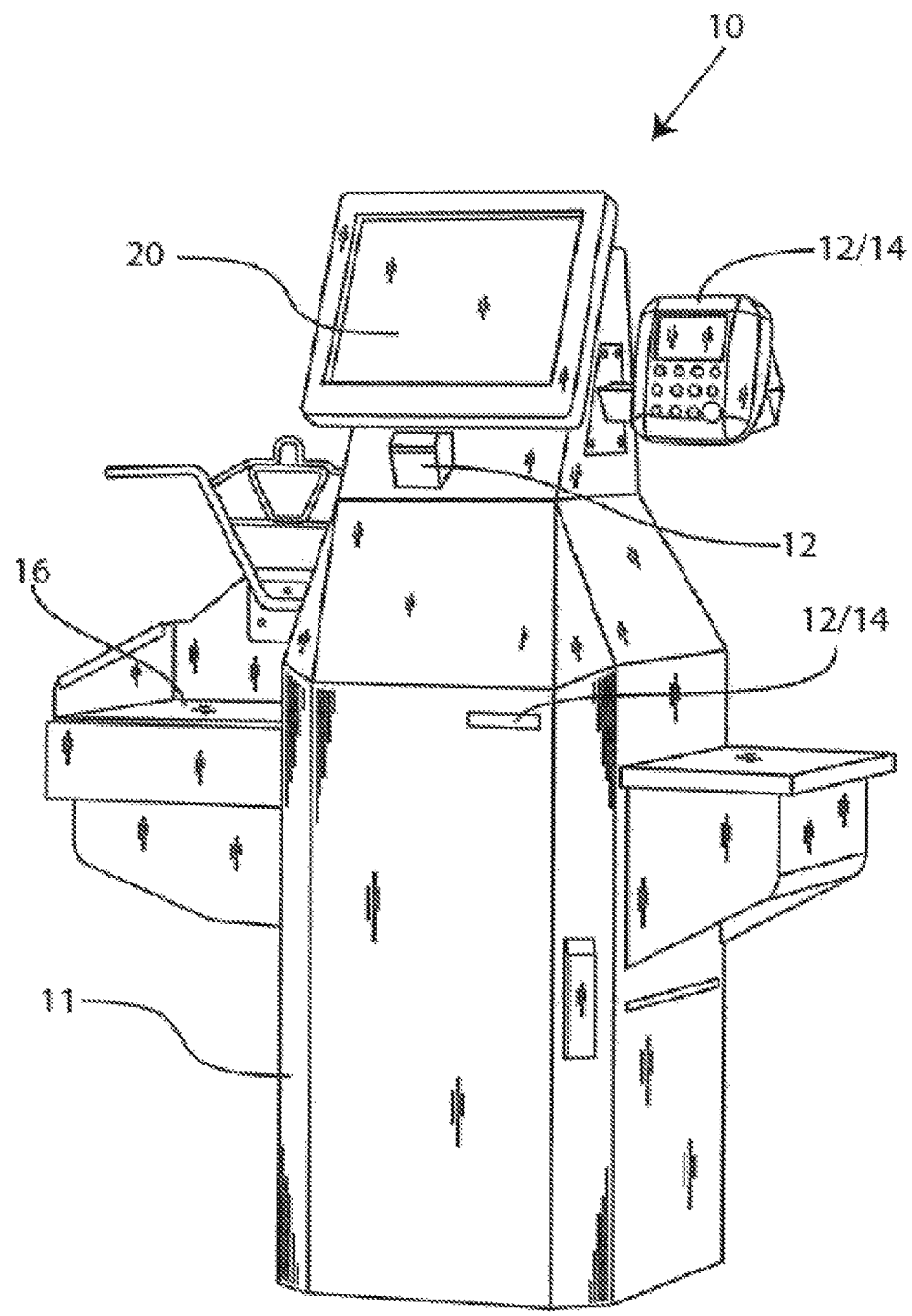
FIG. 1 is a front perspective view of one example of a self-checkout system.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms. It will be understood that the illustrations are for the purpose of describing an exemplary embodiment of the invention and are not intended to limit the invention thereto. Many checkout and self-checkout systems are known in the art, and FIG. 1, generally designated 10, shows one example of a conventional automated self-checkout system. Typically, self-checkout systems include at least one kiosk. The kiosk usually includes a housing 11, typically of compact design, which accommodates or houses the other aspects of the self-checkout system. The housing 11 may be a pre-existing structure at the installation site of the self-checkout system, may resemble the housing as shown in FIG. 1, or may take on other shapes able to accommodate the other aspects of the invention.

The kiosk may also include input modules 12, output modules 14 and transaction modules 16. The input module 12, as seen in FIG. 1 may be, for example, a coupon-in center, credit/debit card reader, or a payment center. The input module 12 may typically be supported on, integral to, or attached to the housing 11. Input module 12 is arranged to accept input about or for the transaction, for example, from items being purchased by recognizing the item, such as through selection on the display 20 by the customer or by recognition of an identification or code. A bar code scanner would be another example of an input module 12 suitably found in the kiosk. Other examples, inter alia, may include one or more keypads to key in information, RFID reader, a microphone (potentially with voice recognition software), a touch screen keypad, a video camera, tablet computer, wireless communication receiver, a credit card reader, a debit card reader, a smart card reader, a loyalty card scanner, a cash receiver, a wireless transmission router, a mobile phone, and/or any of these in combination.

Output module 14 may include a coin-out center, a cash-out center and/or a receipt center. Output module 14 is arranged to provide and receive information during a transaction. Output module 14 may provide instructions to the purchaser or provide feedback from input received through input module 12. For example, the identification and recorded price of scanned items may be displayed to the customer on display 20. In the case of a touch screen display, purchasers may also input information on display 20 making the display serve as both a part of the input module 12 and output module 14. A speaker (not shown) may also serve to provide audio information to consumers. Other examples of output module 14 may include a private printing page, a link transmitting to a handheld device such as a mobile phone or tablet computer or the like.

Transaction module 16 may include centers accommodated by housing 11 where parts of the transaction occur, such as the bagger 16 and potentially an auxiliary bagger. Transaction module 16 may also include, by way of example, weigh centers, bumper guards or transaction shelving centers.

Figure 1A:
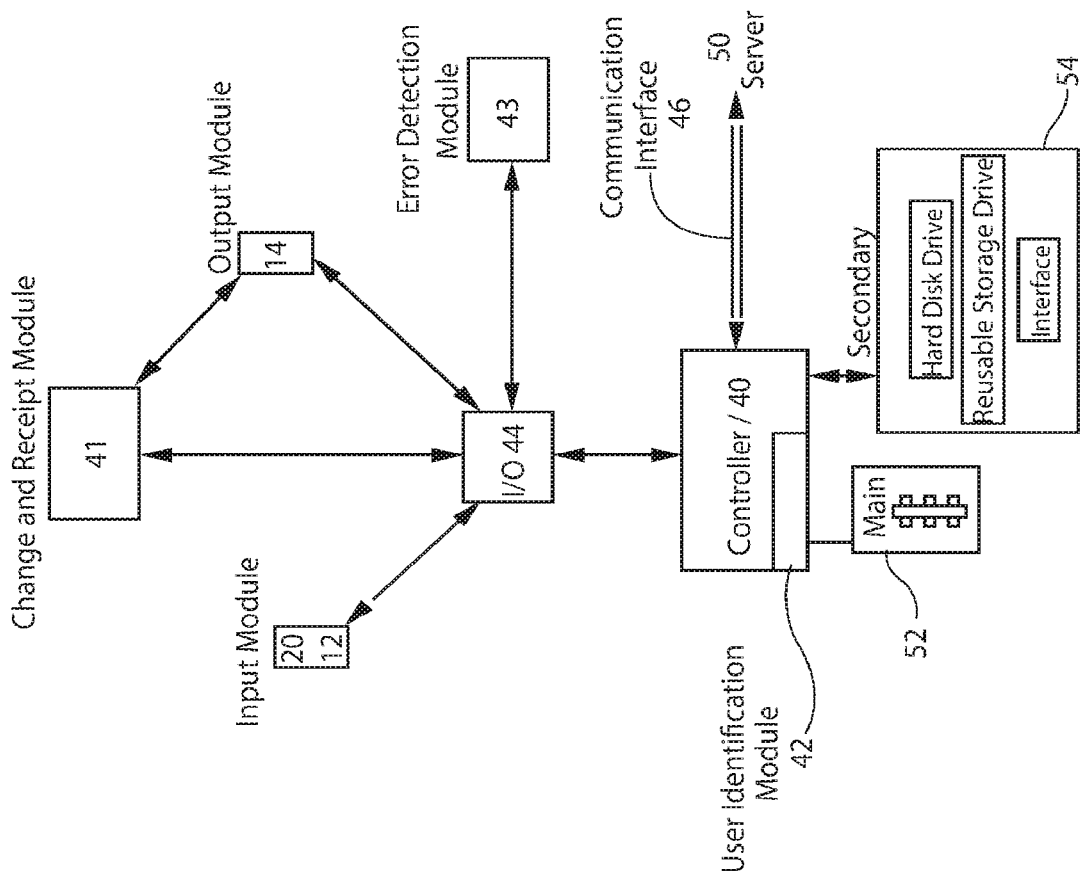
FIG. 1A is a flow chart illustration of one example of the controller and input and output systems of the self-checkout of FIG. 1.

A checkout system may further include a POS computer system. The POS computer system may include a controller 40 (as shown in FIG. 1A), operatively connected to the input module 12 and output module 14. The controller has POS programming arranged to process information from the input module 12, such as the items being purchased in the transaction, and to provide information through output module 14 to the customer to allow completion of a customer transaction through system 10.

A controller 40, such as a microprocessor, may be, for example, in the kiosk or store database computer, and usually includes an associated memory. The controller 40 connects through input/output ports 44 in order to receive information from and to provide information to the modules included in the kiosk. By way of example, the controller receives information from the input module 12 and provides data to the output module 14. The controller may have a clock component so that elapsed time between events can be determined. Other configurations of times can be used.

Shown in FIG. 1A, the POS computer system may include a main memory 52 or a secondary memory 54, or both, which may communicate with the controller. The main memory is generally a random access memory (RAM) that may include an item buffer for temporarily holding identification information corresponding to scanned items before the items are verified by the kiosk. On the other hand, the secondary memory with standard input/output ports may include any storage medium such as but not limited to a hard disk drive, a SCSI drive, a removable storage drive or removable storage units and interface. Alternatively, the secondary memory may include handheld computing devices, as well as one or more databases such as a look-up database that includes SKU number, price, item codes, tolerance range for the item or for a class of items, and corresponding weight, height, length, or width for each item in the store. This database may reside on one or more of different or additional computers such as at a central store server 50 or a remote server outside of the location.

Additionally, it is contemplated that the kiosk may not include a main memory. In this situation, the controller may communicate with the secondary memory 54 which may be a remote server, for example, accessed via local area network or global networking such as the Internet or Intranet, and refresh a display screen with information and software stored in the remote server.

Unattended vending type self-checkout systems may be beneficial in places such as in employee break rooms or hospitals where staggered lunch shifts and work breaks cause several massive influxes of consumers at specific times throughout each work day. These influxes cause lines to form at the unattended self-checkout kiosks. It is not unusual for many of the consumers to have prepaid cards with stored value that is decremented with each purchase, and which the consumer may increment at their choosing using cash or credit at the kiosk. Delays at these types of self-checkouts may prevent some consumers from making their purchases when lines develop and people are operating on strict schedules.

Most consumers and retailers would prefer the retail checkout process be as quick and accurate as possible. To confirm accuracy, consumers prefer to see that they received the correct prices, discounts due to them and that their vendor coupons were applied correctly to the sale. Concurrently, retailers prefer to be as productive as possible during the checkout process. The speed of a checkout process may also be influenced by the number of items being purchased.

For these and other reasons, grocery retailers are most challenged to provide speed, accuracy and productivity within the checkout process.

One attempt to balance productivity, speed and accuracy at the checkout has been the use of the self-checkout system. With self-checkout, the consumer scans and weights their own items, and normally a single cashier/attendant monitors multiple self-checkout terminals, thus providing a higher level of productivity per cashier/attendant. Problems still exist with the self-checkout approach, for example, the lack of speed and accuracy, and consumers not being trained to process items quickly. Many consumers can become confused by the self-checkout process, leaving room for accuracy errors. Self-checkouts also introduce a theft variable, not present usually at an attended checkout. For at least these reasons, much of the burden of the checkout process is still being placed on the cashier. This burden typically includes scanning some items, inputting non-barcoded items, weighing produce, scanning store coupons, scanning vendor coupons, making adjustments to the customer records (such as receipt delivery preferences) bagging items, receiving payment and returning correct change to the customer. The heavy workload placed on a single cashier, often in the checkout and self-checkout scenario, causes a bottleneck inhibiting faster checkout for the customer and productivity to the retailer.

In some cases, the cashier's workload is lightened, for example, by adding to the number of personnel for activities such as bagging. In other scenarios, the cashier's workload results in the customer helping to bag items in order to move the transaction along, neither being desirable options. However, other alternatives are also developing, such as allowing the consumer to use a mobile device to pre-scan items for checkout. Additionally, some retailers are utilizing automated scanning devices, which scan the items after the consumer places the items on a moving belt, thereby reducing the workload further for the cashier and thus speeding up the checkout process. Still other retailers are utilizing pay stations, which allows the consumer to pay at another location within the same store, after an attendant has already successfully entered all items being purchased, has bagged the items, has made adjustments to the customers checkout preferences record, and has applied all manual discounts, store coupons and vendor coupons to the transaction.

Currently, the retail checkout process is highly concentrated around the workload of either a cashier at an attended point-of-sale station or consumer at a self-checkout station. That is, either the cashier performs the bulk of the work needed to checkout or the consumer does. Another emerging solution is a hybrid checkout scenario, which allocates the work more evenly between an attendant, a consumer and a checkout machine and so speeds up the checkout process while simultaneously increasing transaction accuracy. In some cases, the hybrid checkout offloads the work load associated with store coupons, vendor coupons, scanning or entry of impulse items, and customer ID association to the transaction, all of which is performed away from the primary item scanning area. All of these scenarios are aimed at reducing the workload of the cashier, allowing the consumer the ability to more closely check that they have received all of the associated credits, and moving the consumer away from the scanning area so the next consumer in line can have their items quickly scanned and bagged.

One example of this hybrid technology includes an Automated Scanning Device (ASD) station and/or a pay station, which may exist together or independently of each other. The consumer loads the merchandise they wish to purchase onto a conveyor belt, which conveys the item through the ASD, where it is automatically scanned. As the item is conveyed out of the ASD, the attendant bags the item. Once all items are bagged, the consumer may proceed to an unattended pay-station, where the consumer can resume the transaction and scan any corresponding vendor coupons, store coupons, as well as scan, enter, and/or projection RFID to associate their customer identifier, which may provide any other additional benefits owed to the consumer such as special pricing or loyalty rewards. Additionally, the consumer can also make changes to their account, such as selecting options to receive their receipts by way of email, selecting options to opt out of printed receipts, opt in for marketing specials, and update their mailing and email address.

Additionally, the consumer can, if authorized to do so by configurable security settings, remove unwanted items, for example, if the current running total is greater than the amount the customer wishes or is able to spend. In one such scenario, the hybrid system would allow the customer to remove items without store personnel approval and may alert store personnel so that they may approve and or assist in the item removal process. Finally, after all new items are added, unwanted items are removed, and the correct discounts have been applied, the consumer can finalize the transaction by way of selecting the tender type, be it cash, credit, debit, gift card, pay pal, google wallet, prepaid card, house charge, RFID and/or a mix and match of several payment types. In one example, a pay-station would complete the transition and deliver the receipt as instructed to do so by the customer's account settings. Other examples may include using selections from the consumer prompting by the pay-station. In order to further reduce the chance of a bottleneck from occurring at the hybrid checkout, a ratio of one-to-two or higher, scanning area to paystations, may also be employed.

As advancements in checkout technology, such as ASD scan tunnels and pay stations develop, applicant realizes that new challenges are also presented in implementing and using ASD checkouts. Surprisingly, some aspects of the hybrid checkout may actually interfere with efficiency and transaction speed, therefore frustrating consumers and discouraging repeat usage. FIG. 2A through 2D show examples of a hybrid self-checkout, including a scan tunnel, generally designated 130. Another example of a scan tunnel is seen in U.S. patent application Ser. No. 12/283,439 to Zhu as published U.S. Patent Publication 2009/0134221, the Zhu application being incorporated herein in its entirety. Yet another example of a scan tunnel checkout is the Scan Portal offered by Datalogic.

A check out with an ASD typically includes an unloading area 132 for the customer to place the items for purchase at a consumer interface. This environment may be more attractive to the consumer than that found in the traditional self-checkouts because it often may appear similar to traditional, attendant-manned checkouts where the items for purchase are placed on a conveyor belt and transported to the attendant. In operation, a customer approaches the unloading area, for example, a roller transport or conveyor belt designed to transport the items to be purchased, and places the items in the unloading area 132. Unlike attended checkouts and traditional self-checkouts however, the items are not required to be scanned by the customer 131 or the attendant 133. The items are taken from the unloading area 132, through a scan tunnel environment 134, where the items to be purchased are automatically scanned. Various item recognitions may be taken of each item or particular items as they travel through the scan tunnel. For example, a SKU, bar code, RFID tag, PLU, may be recognized. Additionally, a photo, volumetric representation, or weight measurement may be taken of the item.

The items for purchase progress to an item collection area 136 where the customer and/or attendant may bag the items. Since neither the customer nor the attendant is required to pick up each item for scanning or transaction entry, the transaction speed is increased. The increased transaction speed and reduction of transaction responsibility for the customer is attractive, even for larger transactions. Attendants' responsibilities in a hybrid checkout scenarios, such as a scan tunnel (portal scanner) scenario, is somewhat changed from more conventional systems. The attendant now has two main functions: 1) bagging items and 2) handling exceptions. These functions will occur rapidly and in higher volume during most transactions than previously experienced by attendants at more traditional self-checkouts.

Often, an attendant work station (AWS) 135 (shown in FIG. 2D) will be provided as a part of the hybrid checkout environment at an attendant interface, much the same way that an attendant has an attendant work station at a conventional checkout. Traditionally, brick-and-mortar retail transactions, however, do not require front-end store employees to multi-task in the manner required at scan tunnel self-checkouts. The traditional, staffed, point-of-sale paradigm may have either a single cashier who scans first, then bags later, in a serial fashion, or both a cashier and a bagger. In either point-of-sale, the level of multi-tasking described above is not required because the interaction with the system (scanning items, handling exceptions) and bagging are temporally and spatially separated, whether they are done by one employee or more.

Figure 2B:
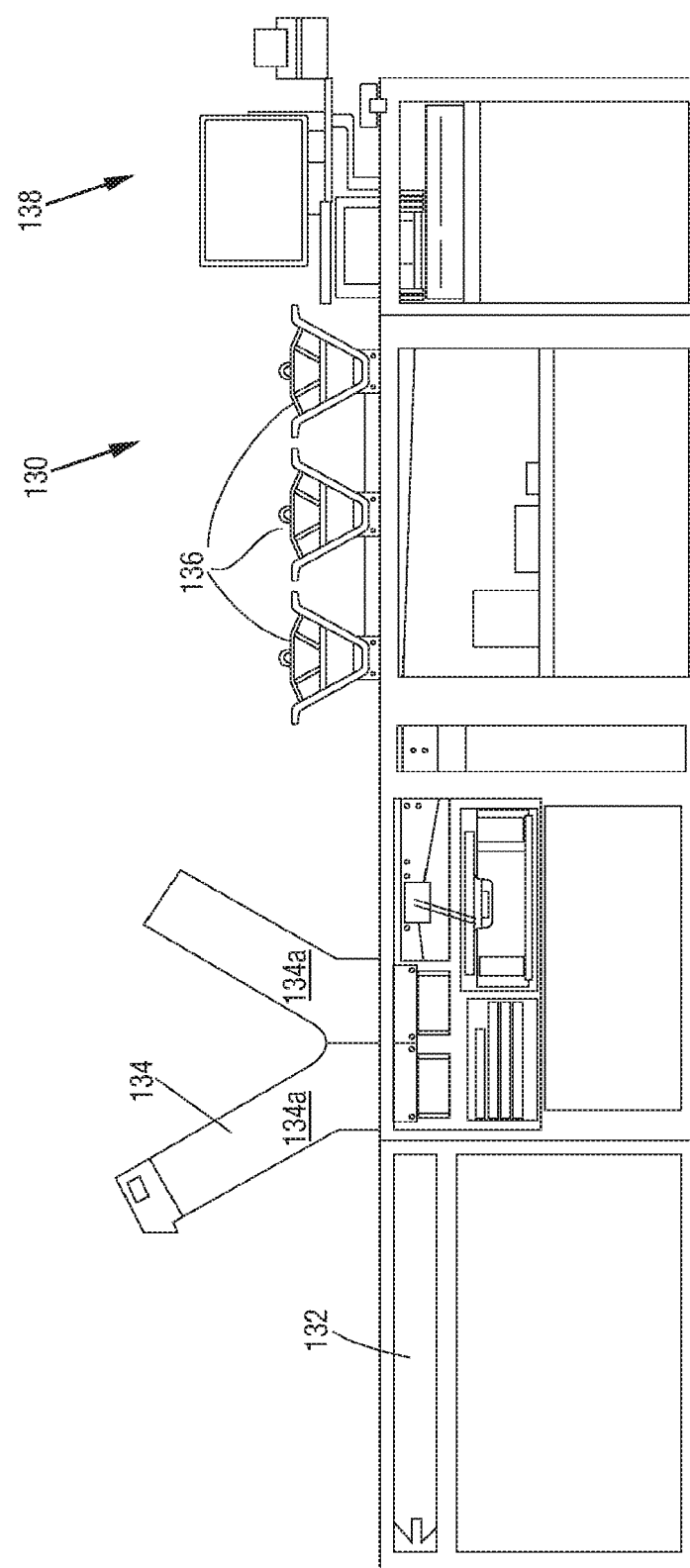
FIG. 2B is a side view of one example of a hybrid checkout including a scan tunnel environment.
Figure 2C:
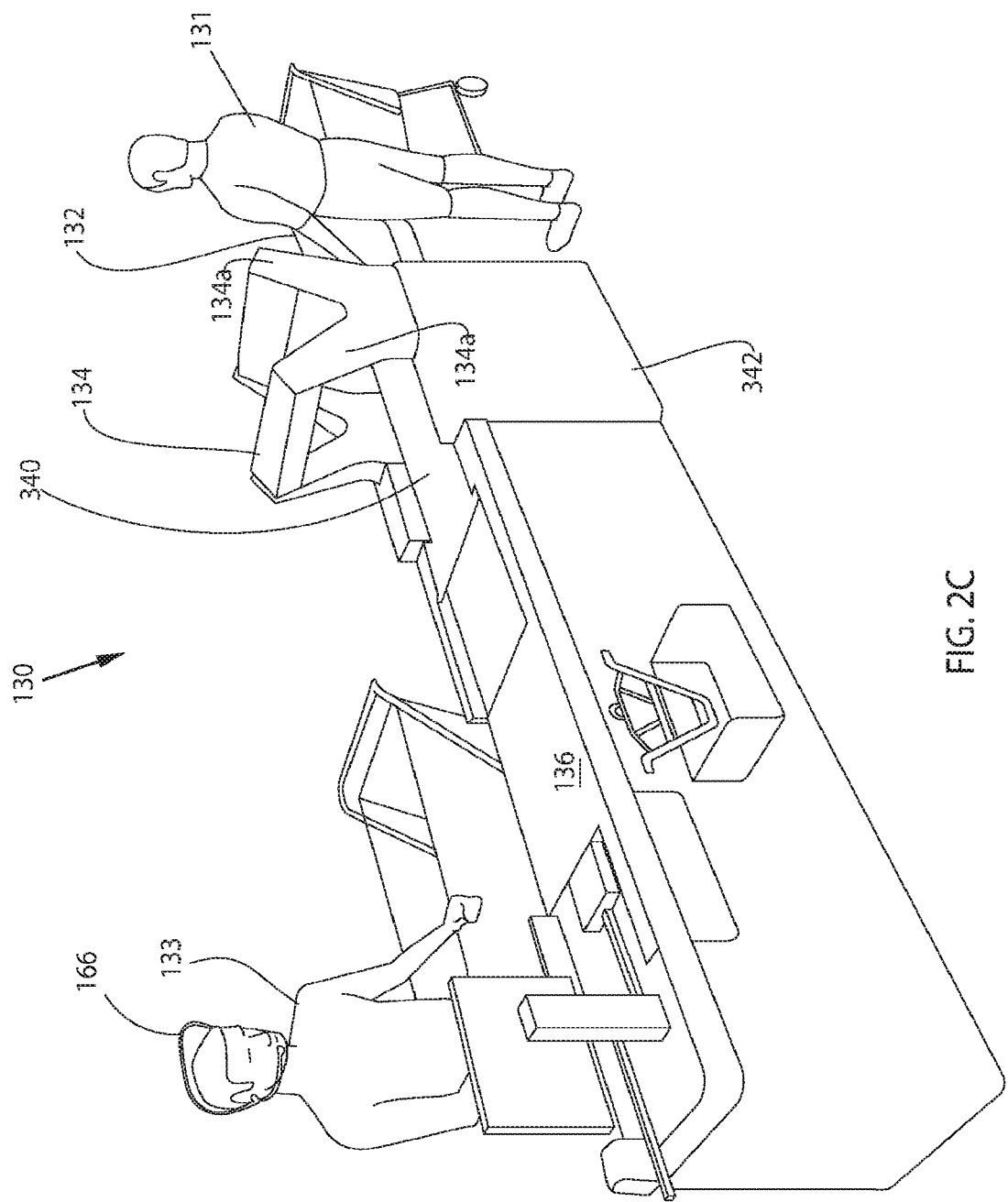
FIG. 2C is a perspective view of one example of a hybrid checkout including a scan tunnel environment.

In one example, FIG. 2C shows an ASD contained within a check-stand style unit 130 in which the scanning portal includes an arch/arches 134a that straddle conveyor belts 340 that move a consumer's items through the portal so that they pass among, and are scanned by, the scanners, for example by the scanners' lasers, and are thus entered into a transaction. These components are mounted on a base 342, as shown.

Figure 2D:
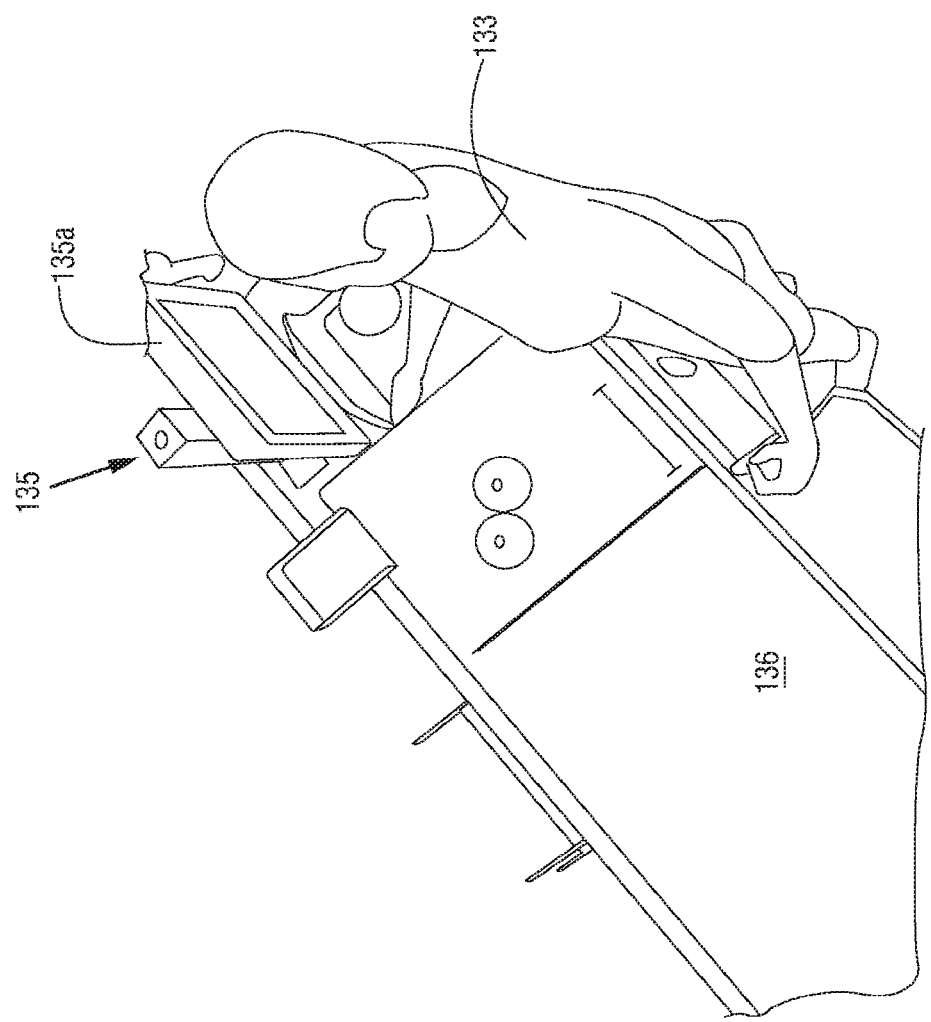
FIG. 2D is a top view of one example of an attendant work station.

A point-of-sale system, as described earlier and shown in FIG. 1A, is integrated with 1) the portal scanner and 2) the conveyor belt 340 to enable communications with, and control of, each system. An attendant work station (AWS) 135, an example as seen in FIG. 2D, may include multiple input/output peripherals (touch LCD 135a, headset 166, scanner-scale, printer, hand held printer, etc) that allows an attendant to monitor each transaction with the primary function of bagging items and handling exceptions. Exceptions are typically items that are unrecognized by the system and/or that delay a transaction, for example, because bar codes cannot be read, additional clarification is needed, and/or because they do not have bar codes (such as produce and PLU-only items). Other items, such as those requiring age verification are also considered exceptions because they also involve intervention by the attendant and interaction with the system.

In one example, when an exception item passes through the ASD, the scanner portal 134 sends a representation, such as a photo or identification, of the item to the point-of-sale (POS) control system 150. The POS control system 150 enumerates or identifies the item representation and places it in view on the AWS display 135a. In one example, the sequential numbering of exception item photos and/or text representations allows the attendant to select items by recognizing the item, for example by the associated number, and take the needed action.

Figure 3:
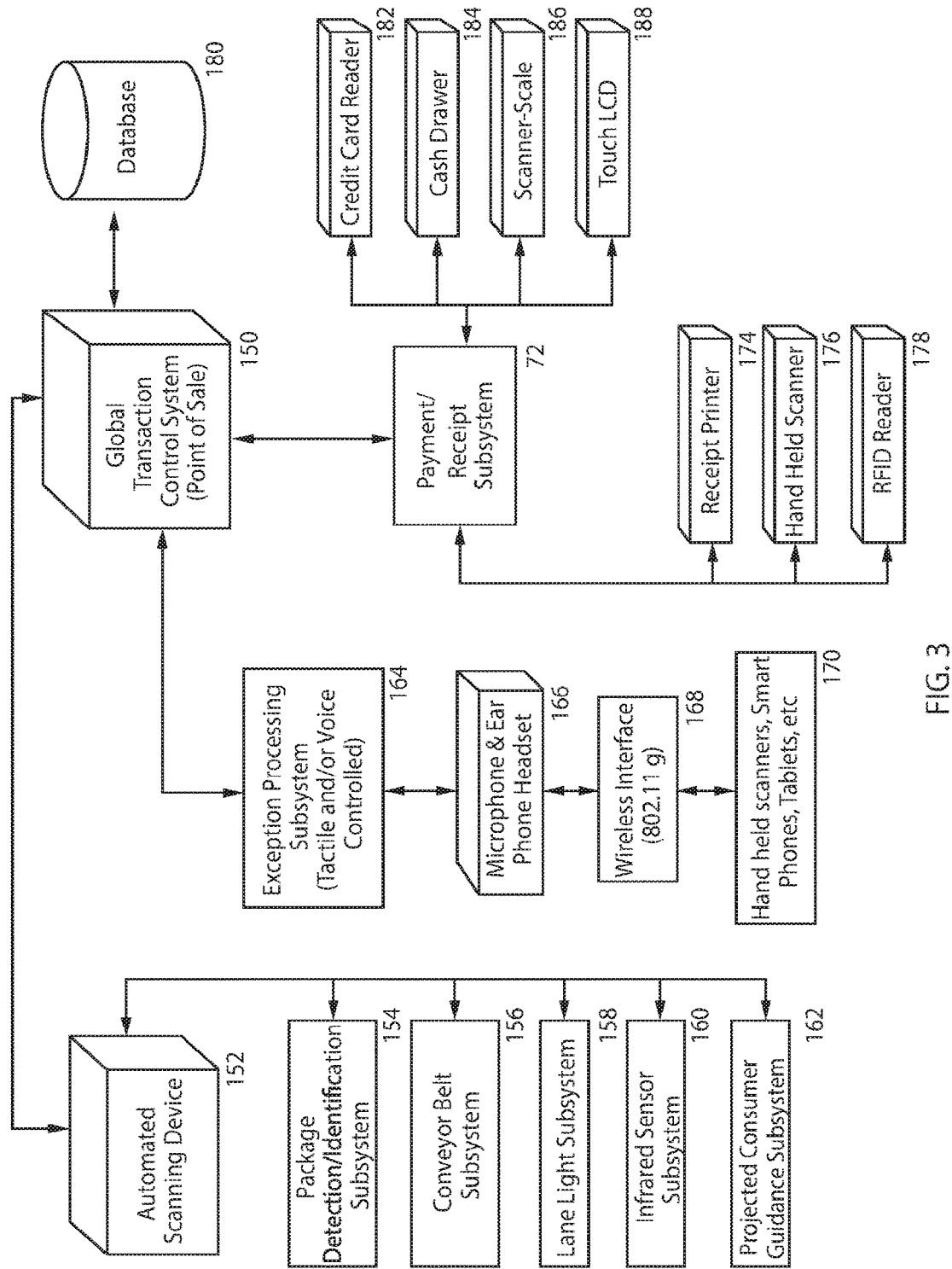
FIG. 3 is a block illustration of one example of a hybrid checkout including an ASD (Automated Scanning Device)
Figure 3A:
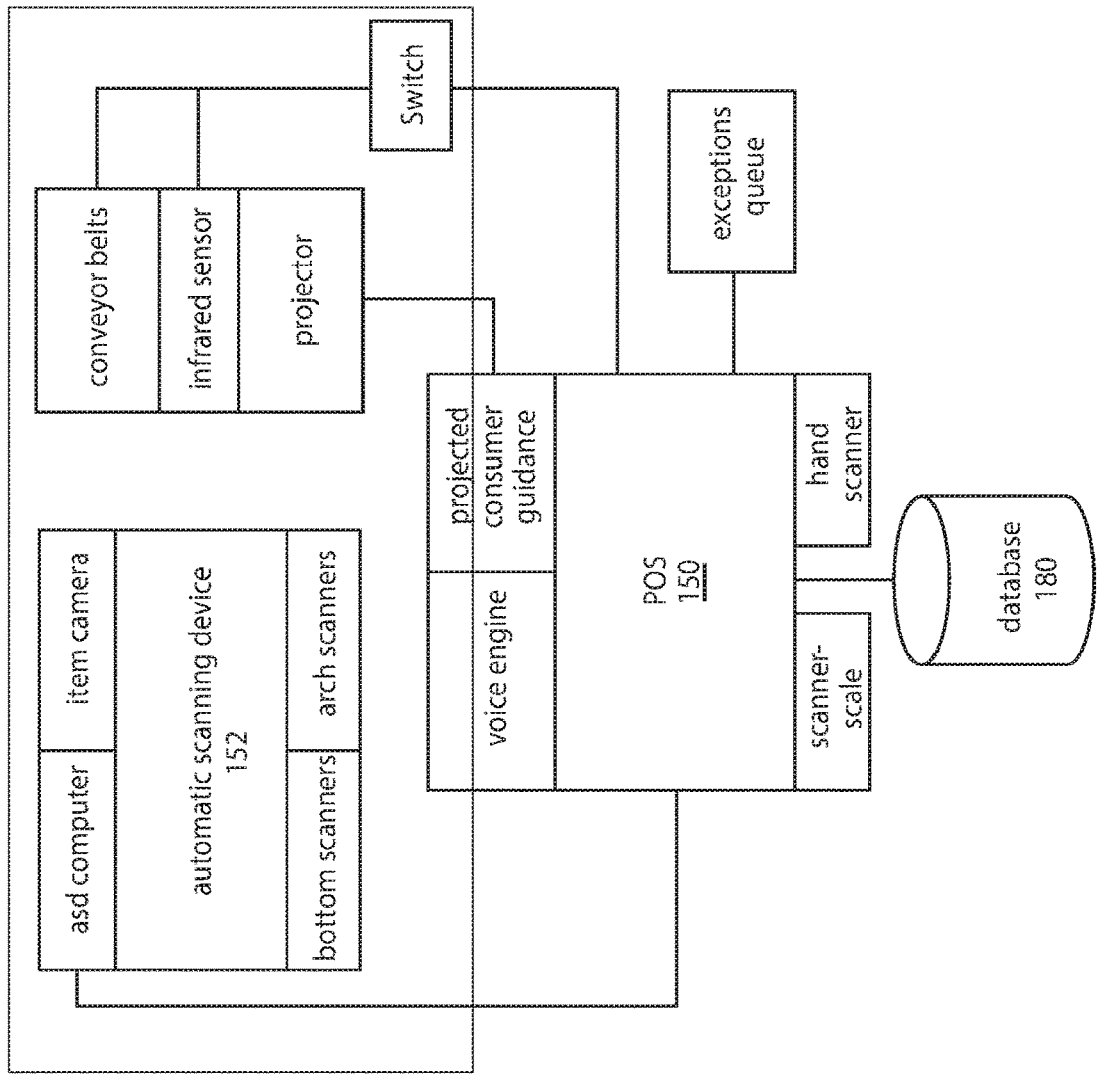
FIG. 3A is a block illustration of another example of a hybrid checkout including an ASD.

FIGS. 3 and 3A are block graphic representations of an example of an improved hybrid self-checkout system, including an ASD. In this example, the hybrid checkout system includes a global transaction control system 150 in communication with an ASD 152, an exception processing subsystem 164, a database 180 and a payment/receipt center subsystem 172. The ASD 152 may include a package/identification subsystem 154, an unloading surface such as a conveyor belt subsystem 156, a lane light subsystem 158, infrared sensor subsystem 160 and/or a projected consumer guidance subsystem 162. The exception processing subsystem 164 may include a microphone and ear phone headset 166, wireless interface 168 and/or hand held scanners 368, smart phones, tablets and/or computer access 170. The payment and receipt subsystem 172 may be in communication with a receipt printer 174, scanner 176, RFID reader 178, credit card reader 182, cash drawer 184, scanner scale 186 and/or a touch screen LCD 188.

In another example, Applicant's inventions as described in FIG. 3 may be applicable to improvements in traditional attended checkouts and self-checkouts. Also, Applicant's inventions, as described, smooth the transition between attended checkouts, traditional self-checkouts and the increased speed and changes to the checkout process occurring at hybrid, for example, scan tunnel and paystation, self-checkout environments.

Hands-Free Transaction Voice Command Module

Figure 4:
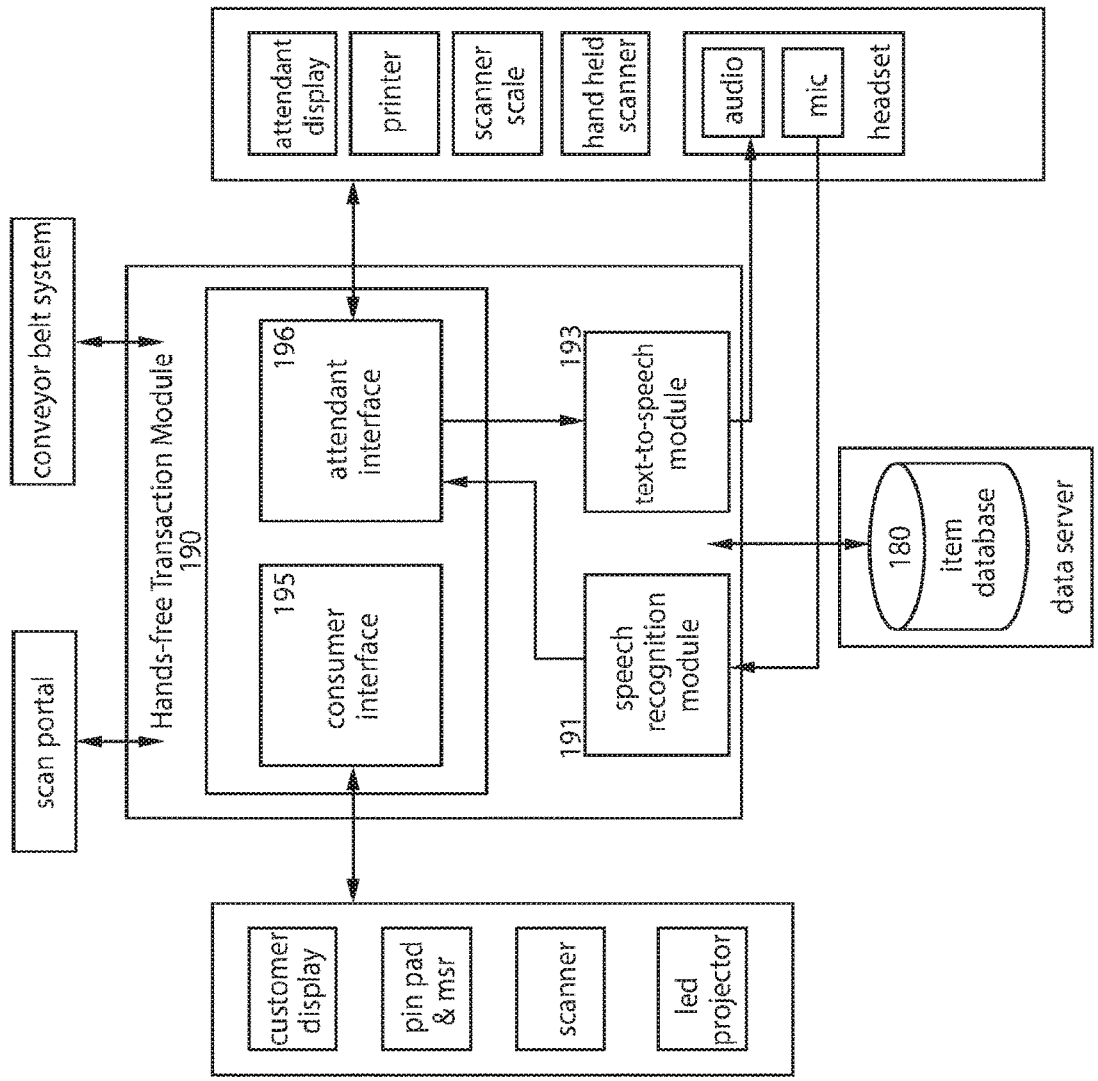
FIG. 4 is an example of a functional block diagram of a checkout including a hands-free transaction module.

In one embodiment, the invention includes systems and methods for achieving a hands-free exception management so that the attendant's hands can be allocated to other duties, such as the bagging process. The checkout system may include a hands-free transaction module that is in communication with the exceptions processing subsystem 164, payment/receipt subsystem 172 and the database 180 so that a traditional point-of-sale, self-checkout and/or hybrid transaction may be directed and concluded by the attendant in a hands-free manner. FIG. 4 shows a block graphic representation of one example of a hands-free transaction module 190. The hands-free transaction module 190 may include a speech recognition module 19*l* and a text-to-speech module 193 and be in communication with a consumer interface 195 and an attendant interface 196.

In one example, attendants may use a voice command module, including, for example, earphones and/or headset 166 that includes one or both earphones (for incoming audio signals) and/or a microphone (for outgoing audio signals). The headset's microphone may be used by the attendant to control the self-checkout transaction and/or system, for example to handle exceptions, using voice commands instead of traditional physical interaction (e.g. pushing a button) with the system. The attendant may still be able to touch a display, such as a panel PC 138, as seen in FIG. 2B, and/or control exceptions through voice command. By off-loading control of the system to a voice command module, the attendant's hands remain free for the task of bagging, better enabling the attendant to multitask and handle the rapid succession occurring in the transaction. Exception handling may include, but not be limited to, the following: conveyor belt control (stop, start, slow down, speed up, reverse, forward, etc.), processing weighted items, age verification, coupon processing, payment processing and any other exceptions and/or transaction delays arising during the transaction and payment.

Figure 5:
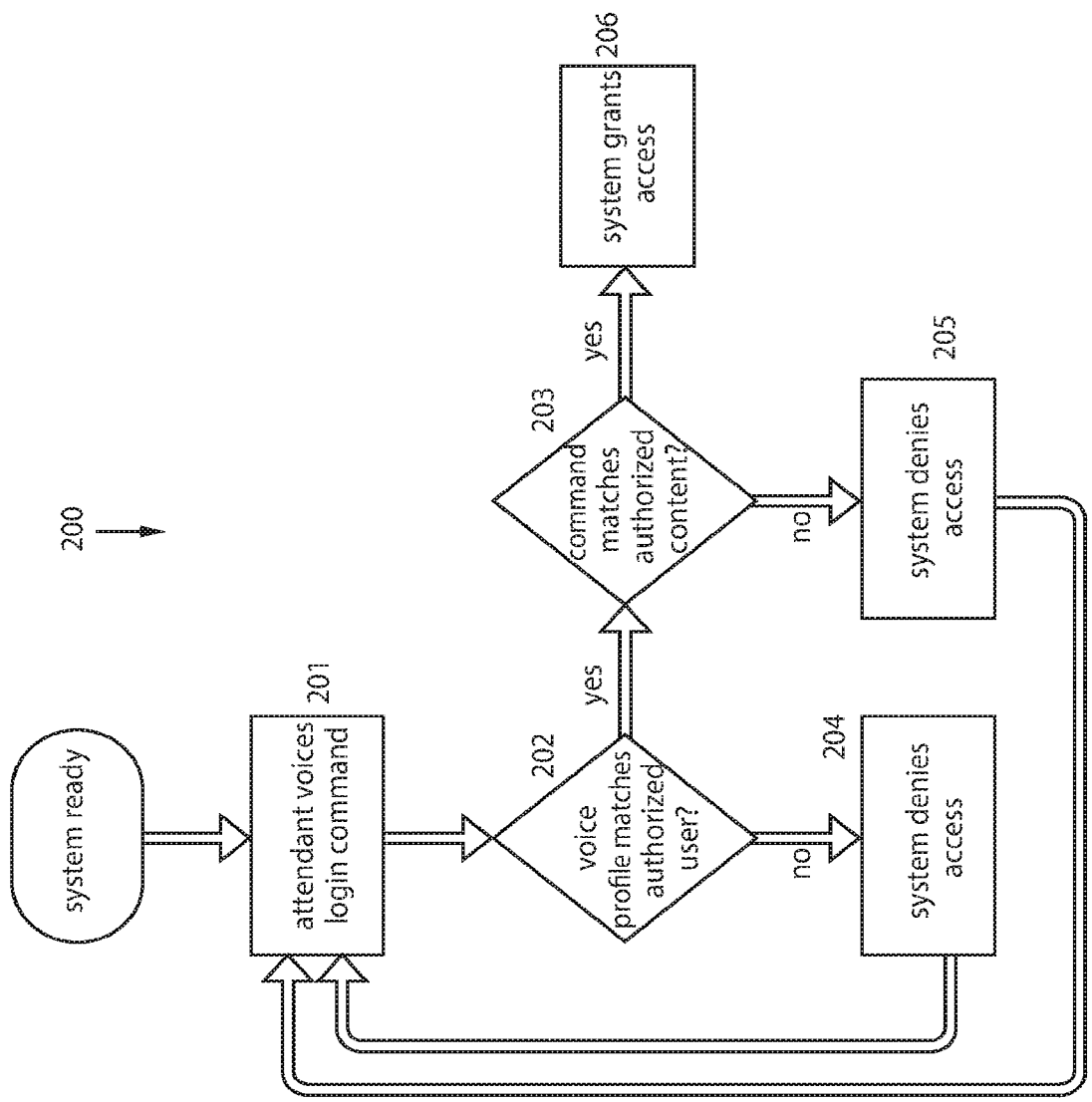
FIG. 5 is a flowchart of a checkout including a hands-free transaction module.
Figure 6:
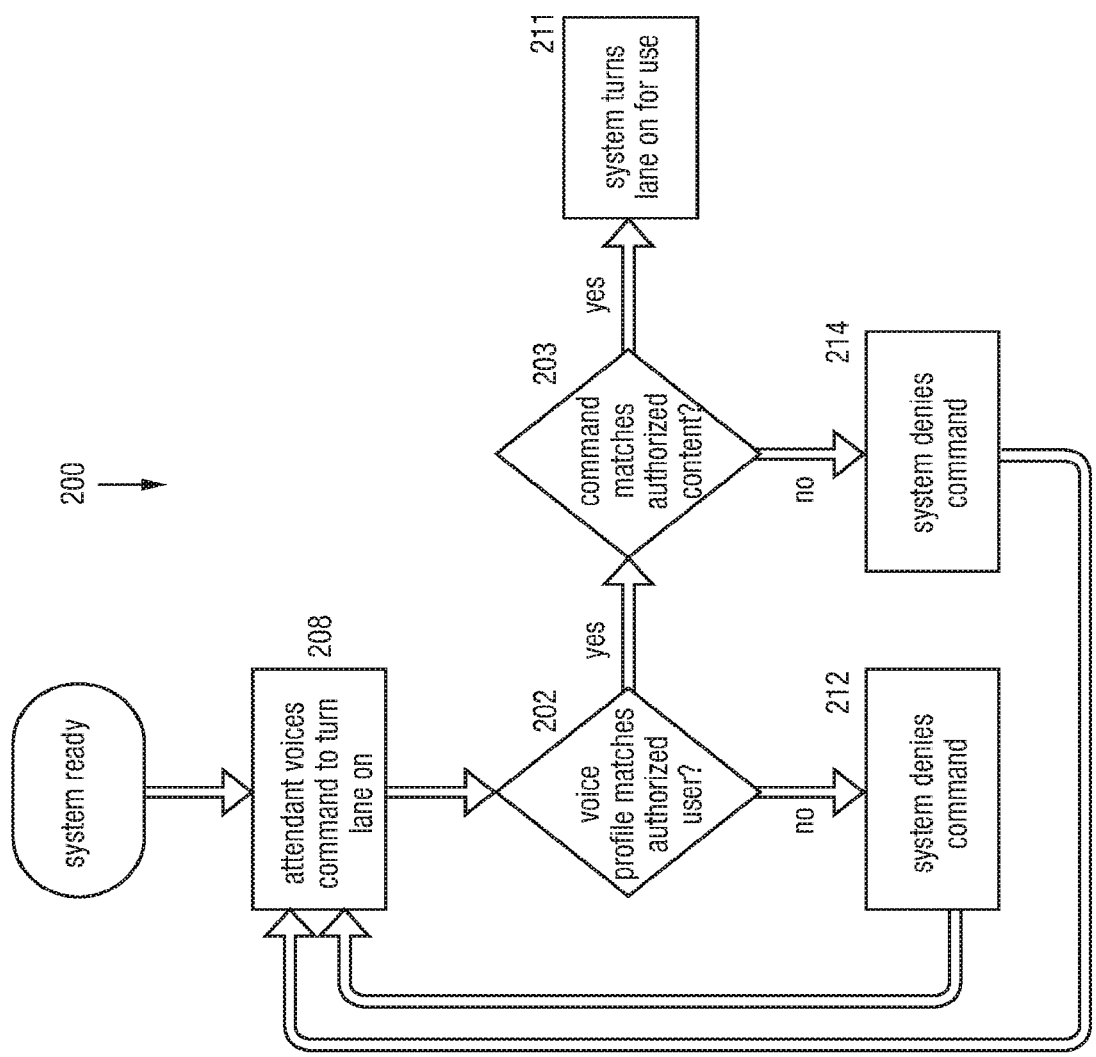
FIG. 6 is another flowchart of a checkout including a hands-free transaction module.

The voice command module may allow the attendant the ability to login/logout based on voice recognition biometrics, as in FIG. 5 and/or the ability to turn on lanes in preparation for transactions, an example of which is represented in FIG. 6. When the system is ready, the attendant may voice a login command 201. If the voice does not match an authorized user 202, then the system denies access. If the voice does match an authorized user's 202, then the system allows the user access. The voice commands being given may be evaluated to determine if they match the users authorized content and access may then also be granted 206 or denied 206. Likewise, an attendant may control checkout system functions by voice command. An attendant may voice a command, for example, to turn a lane on 208 and if the command matches an authorized user's authorized content 203, then the system will respond by turning the lane on for use 211. The voice command module 200 may include text-to-speech integration 193, voice recognition 191 and/or associated biometric information.

Audio prompts are mapped to system controls to achieve any of several functions. Attendants may be notified via audio prompt when an item is in the exception zone. The voice command module provides the attendant hands-free control over various exceptions and component parts. For example, the system may be configured to stop the conveyor when an age required item is located within the exception pickup area 136. When a valid ID is declined, the system may prompt the attendant to remove the item from the bagging area. The attendant may be signaled to verify via voice command, and then the belt is restarted automatically. The system may be configured so that the attendant's language preference is known and will speak to, and take commands from, the attendant in the preferred language (i.e. other than English). Further, the voice command module may include the ability to command the conveyor belts to slow down, speed up, and/or start. Voice prompts may also notify an attendant to return certain items to customers that were sent through on the scanning tray, such as a customer card, or to ask for certain customer items, such as coupons. Communication may be established through the voice command module, for example, with the customer at the customer interface or with management when an attendant is not authorized to handle an exception.

The voice command module may also provide an audio report to the attendant of system diagnostics. For example, the system may evaluate the presence and status of the various pre-determined system components. Once the functioning of those components is evaluated, then a verbal report may be provided to the attendant, for example, that all components are functioning properly and/or that one or more components are not ready to process transactions. The component issues may be specified in the verbal report and a recommendation made, for example, on whether or not the lane should be opened and what actions may resolve the issue. For example, components that may be checked by the system and reported via voice command include, but are not limited to: the scan portal, the conveyor belt system, battery backup, wireless AP, router/switch, digi board, panel PC, card swipe, PIN pad/sig cap, receipt printer, scanner-scale, LEDs internal, LEDs external, projector, lane light, database, network and/or server. There may be a corresponding message on the AWS display for each voice prompt.

Figure 7:
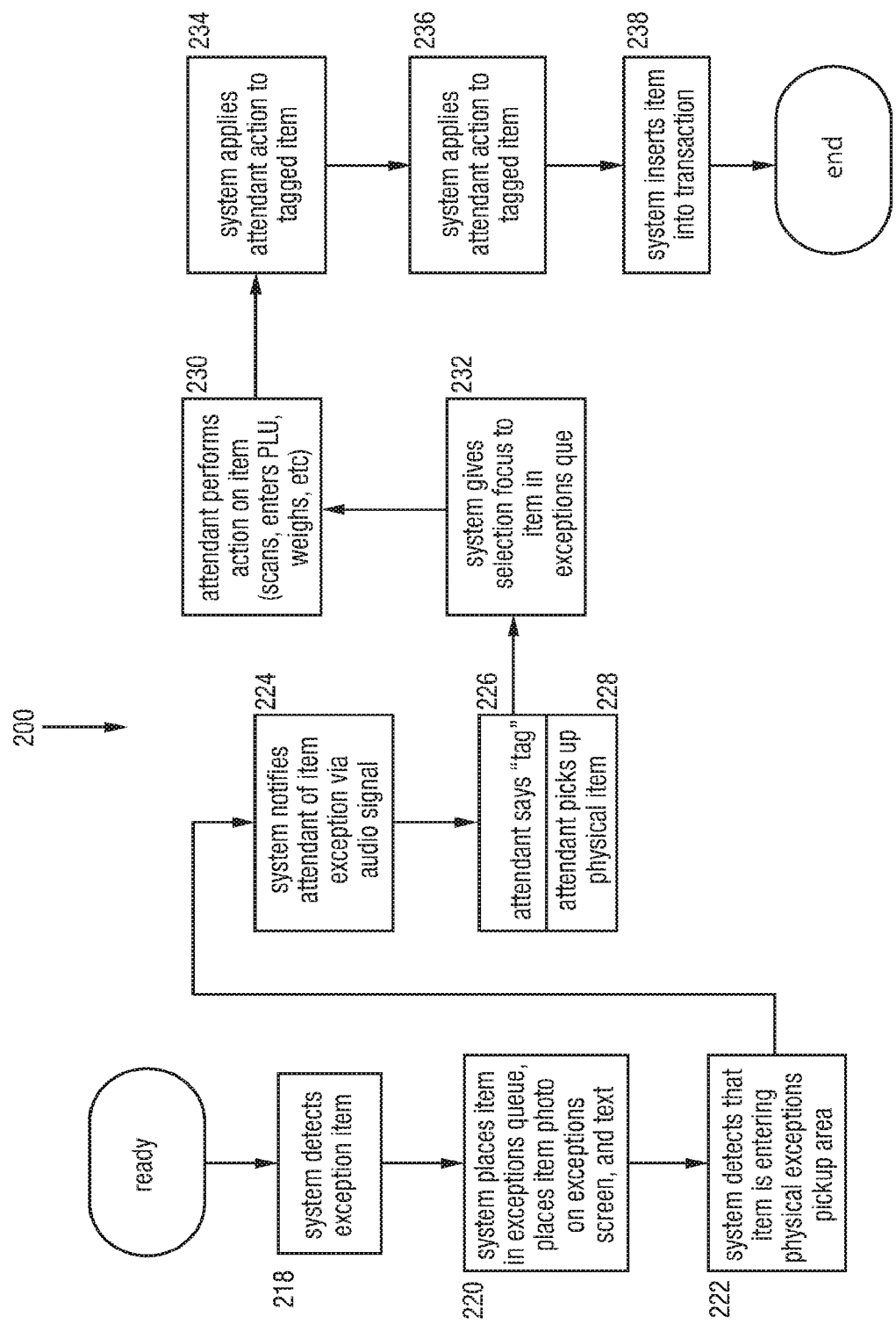
FIG. 7 is a flow chart illustrating one example of a checkout including voice command exceptions processing.
Figure 8:
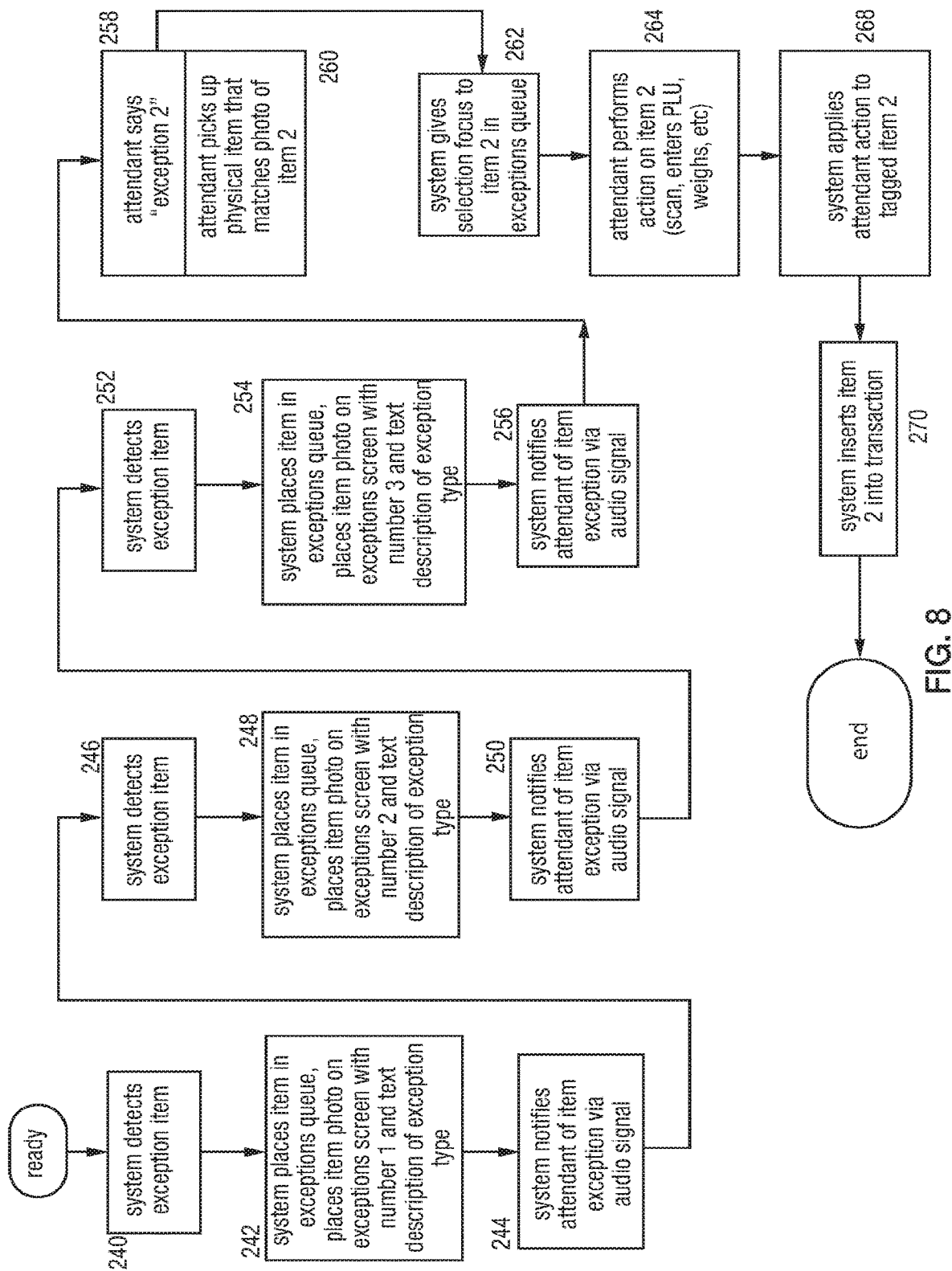
FIG. 8 is a flow chart illustrating another example of a checkout including voice command exceptions processing.
Figure 9A:
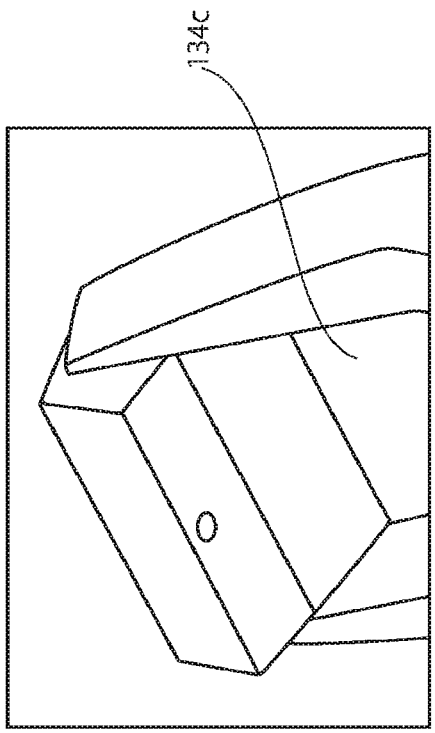
FIGS. 9A-D show examples of a checkout system including a customer guidance module and projector.
Figure 9B:
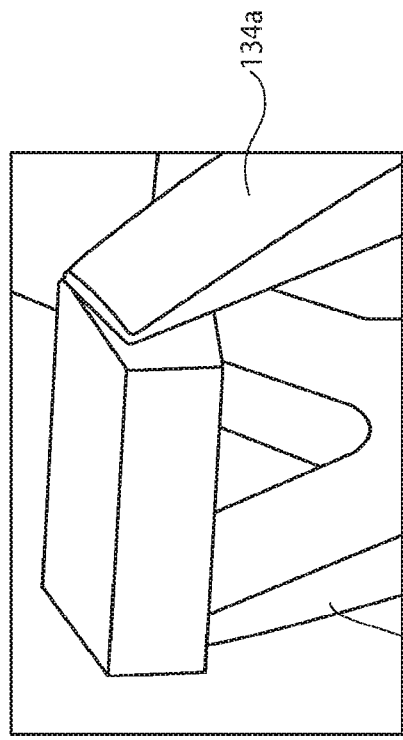
Figure 9C:
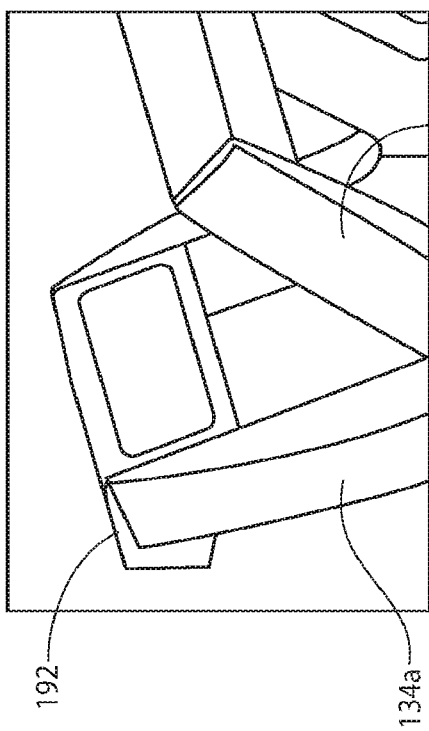
Figure 9D:
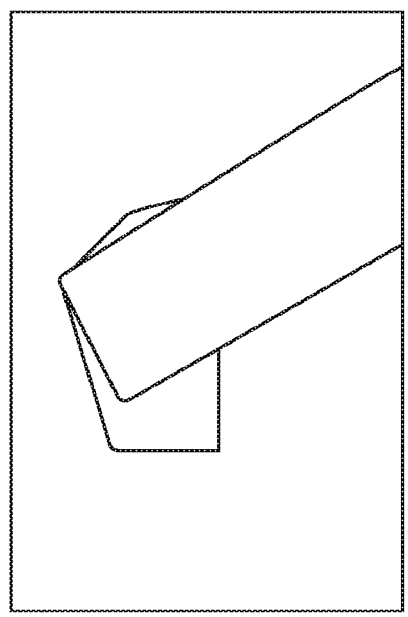

The point-of-sale system may be configured to communicate with or be a part of the controller 40 so that exceptions are organized for the attendant. For example, as seen in FIG. 7, the system may detect unscanned items passing through the portal 218, such as produce. The system may prompt the attendant that an exception exists 224. Once the attendant recognizes an item as produce, he or she may select a produce display option or, for example, may give a voice "produce" command and instruct the system to override the exception. The attendant may also choose to "tag" the item 226 and/or may opt to pick up the item for inspection 228. The system then gives the item an item recognition 232, such as a photo taken in the scan portal, a sequential number and groups it with other produce items appearing as exceptions on the AWS screen.

Alternatively, if a bar coded item passes through and an exception occurs, the attendant may select a "bar code" display option or command. The bar code exception is grouped with other bar code exceptions and presented on the AWS screen. The attendant may make selections to handle the exceptions on the display or by voice prompt 234 and the system applies the attendant action to the tagged exception item 236. The item may then be inserted into the transaction 238.

If an item passing through the scanner is unable to be identified, then a notification may be sent to the attendant to check the exceptions pick up area for item identification. The timing of the notification may be adjusted based on speed of belt, attendant's preferences and/or compliance regulations, for example ADA or OSHA regulations requirements.

Once notified, the attendant typically turns his or her attention to the exception pick up area 136 and verifies that item against the exception screen recognition. The attendant may say "exception number" or "next" or provide an acceptable audible direction or, for example, select from the possible correct identification shown on the display 188 or highlight the matching recognition to the exception item to be resolved. When the exception is resolved, the item is removed from the screen 188 and exceptions listing and either cancelled or placed in the transaction listing. If there is only one exception, then the system may automatically process the exception direction of the attendant without an exception first being highlighted or selected.

FIGS. 5 through 8 show example transaction progression directed by the hands-free transaction module 90. When an attendant successfully logs into a hybrid checkout system, including an ASD, the hands-free transaction module allows for automated exceptions processing. When the exception processing subsystem detects an exception item, the system places the exception in queue and shows the item on the screen 188 for the attendant. The exception processing subsystem detects when the exception item is entering the physical exceptions pick up area 136 and notifies the attendant of the item exception via audio signal such as in headset 166. The attendant gives verbal instruction via the microphone in headset 166 to "tag" a particular exception in a command that is recognized by the subsystem. The exception item is highlighted or tagged by the subsystem and associated with the next attendant action. The attendant performs the action needed to eliminate the exception item, such as weighing the item. The system applies the data from the attendant action to the "tagged" item and eliminates the item from the exceptions listing and uses the data to identify or permit the item so the item, and inserts it into the transaction listing. If more than one exception is displayed to the attendant, then the attendant may identify which exception is being addressed by physically selecting the item on the screen 188 (i.e touching the image of the item on the screen) or by identifying verbally which exception he/she is addressing. For example, exceptions may appear in a listing as exception 1, exceptions 2 and exception 3. The attendant may voice "exception 2" into the microphone, the subsystem recognizes the verbal command that exception 2 is selected and gives the selected exception treatment associated with the next attendant action. For example, if the attendant next says "lettuce," the system recognizes the item as lettuce, looks up the price, and adds the price and "lettuce" word to the transaction listing. Alternatively, the exceptions may appear in other configurations, such as, in blocked columns and rows with exceptions appearing with identifying exception information and an item recognition associated with the exception. Additionally, the "tagging" information may group the exceptions and may appear along with the item recognition.

Other types of exceptions similarly handled by the system may include real-time processing of items needing to be weighed, items that cue missing identification information, items with conflicting recognition, customer identification information, and age verification.

While the hands-free module may be adapted to retrofit and be applicable to traditional checkouts and self-checkouts, it directly addresses the issues with the increased speed of the transaction and exceptions handling associated with hybrid, specifically, ASD checkout systems.

Gestural Command Exception Handling

In another example, an improved bi-directional communication between the system and the attendant may be accomplished through a gestural communication module. The gestural communication module may interact with the POS system to yield similar results as the voice command module. Gestural communication may be utilized as a way of allowing the attendant to interact with the system for the previously mentioned scenarios and exceptions. A remote control may be, for example, attached to, worn by or held by the attendant. The remote control may operate similarly as in current video gaming scenarios to recognize and communicate instructions based upon particular gestures. In other examples, a wrist band may be worn. By way of example, a particular movement may be associated with particular exception handling, such as stopping, slowing or speeding up a conveyor belt. The system may be configured to adapt and learn and associate particular user movements with specific commands. Both the voice command module and the gestural command module may be used together by the attendant. For each and both, the voice command module and the gestural command module, finite mappings are used to link words and hand signs to system commands. The gestural command module may also be adapted for checkout, self-checkout and hybrid checkout scenarios.

Multiple-Photo Availability for Exception

In some examples, the portal scanner may include multiple photo capability as an item moves through the scanner. Multiple photo capability includes various representations of an items being acquired as an item moves through the scanner and then made available to an attendant if needed, for example when an item for purchase does not enter the transaction properly and becomes an exception. In order for those multiple photos to be useful to the attendant in a scanner type environment, they must be easily accessible and facilitate the speed with which exceptions are to be handled. Applicant has developed a Multiple Photo module that associates the various photos with a particular item that was scanned and then organizes and presents them at the AWS screen 188 to the attendant. The multiple photo module organizes the photos so that the attendant may scroll through the photos if he or she does not recognize an item. The photos may be organized in a listed manner and in other examples may be organized differently, for example, may appear in rows across and columns down the screen. Also, the attendant may view different angles and access zoom in/out features to assist with item identification. The multiple photo module also may organize the photos so that when rotating between views, the attendant is provided, for example, a 360, 180, or 270 degree side-to-side rotational view of the item.

Additionally, multiple views of the top and bottom of the item may be available. In order to view the multiple photos, the attendant may touch or swipe through the first photo presented on the AWS screen, may access the views through a voice command, a gesture or a remote control, and/or may press an associated button to access multiple views associated with a particular exception item.

When an item is depicted on the AWS display, the attendant may handle that exception by entering that item into the transaction by, for example, re-scanning it, entering/voicing an item ID, or gesturing (PLU, bar code, etc). The system associates the item that was scanned but not identified by the scanner with the identification that the attendant rings into the transaction or is addressing in the checkout exceptions listing. If there is only one item on the screen, the system knows to select that item. Because the portal detects and records item representations, such as volume (height, width, and depth) over time, it can be configured to ring in a bar coded item even if it cannot read the bar code, from a developed history of consistent representations, such as appearances or volumetric measurements associated with the scanned item.

Prompt-for-Price Item Exception/Device Aware Exceptions Handling

In another example, the system may be device-aware so that if a specific exception item is highlighted, and the attendant does not verbally identify the type of item (such as saying "produce" or "bar code"), but the attendant puts the item on the scale or scans the item, software in the system recognizes the attendant's actions as instructions on how to classify the exception item. If the employee scanned the exception item, for example, the system knows to classify it as a bar code item. If the employee puts it on the scale, for example, the system knows to classify it as a weighted item and will automatically display on screen 188 a list and/or category of scale-required items for the attendant to select from. Selection may be touching the screen, making a gesture or voice command, consistent with the modes described above. When, for example, an exception occurs due to the portal scanner recognizing a preprogramed prompt-for-price item, the portal holds the bar code data scanned from the item in the exceptions queue and shows the item, for example, by way of item I.D. or photo of the item, on the exceptions screen, where the attendant is prompted to enter the price before the item is inserted into the transaction. When the attendant selects or attends to the highlighted or chosen exception, it is not necessary for the attendant to take the time to rescan or re-enter the item because the price information is automatically associated with the initial scan information collected from the exception item. This device-awareness feature, as with the other parts of invention disclosed, is applicable to attended checkouts, self-checkouts, scan portals and pay station environments.

Further, if only one exception is detected, then it may be automatically selected by default to be tagged for association with the attendant action. By way of example, if the item needs rescanning due to improper scan, then the next attendant scan is understood by the system to be the tagged item. If the exception item needs to be weighed, then the next item placed on the scale is understood by the system to be associated with the tagged item. When the exception criteria are met, the exception is removed from the exception screen. However, if multiple items appear on the exceptions processing screen, the tagged item will be the exception to which the next attendant action is associated. The tagged item may be, for example, pre-programmed in the system to be recognized by highlighting or other identification such as numbering or listing. Once the attendant takes the action that solves the exception, the system removes the exception item from the screen. Minimizing the time which the attendant must spend handling exceptions by reducing interaction steps (e.g. scanning or re-entering items) helps realize the benefits of a scanner portal checkout system and reduces the frustration such a new system will present to attendants.

Attendant-Adjustable AWS Settings

Figure 2E:
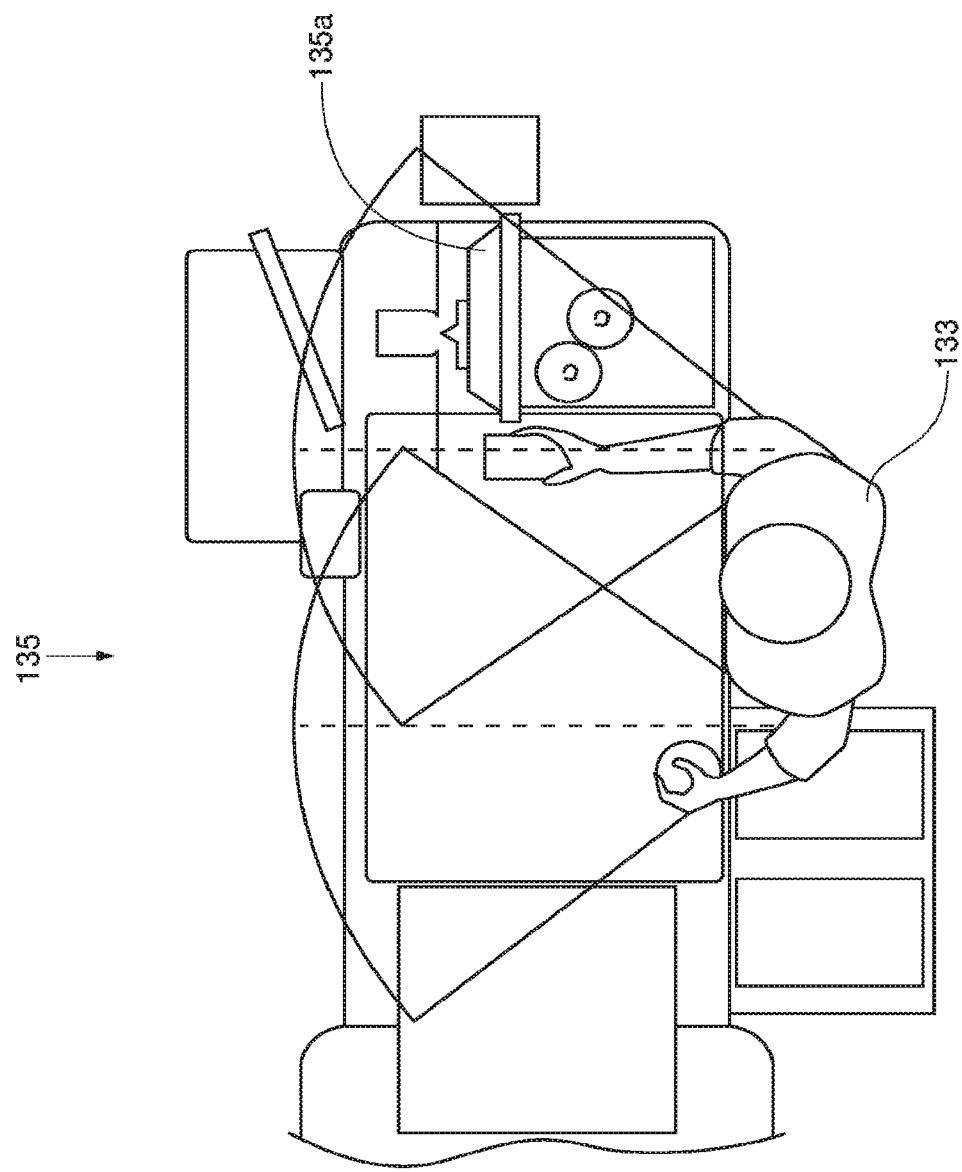
FIG. 2E is a top view of one example of an exceptions pick up area.

In one example, the system may be programmed to only alert the attendant, by way of sound or vibration, that an exception has occurred, and only at a point, when the exception item has reached an exception pick up area 136. The exception pick up area typically will be a place between the scan tunnel and where the attendant is standing or sitting, within ergonomically safe reach of the attendant, and one which does not require the attendant to step one way or another to pick up the item (see FIG. 2E). The exception area often provides a space within which the attendant can physically separate the unscanned (exception) items from the scanned items. The exception pickup area is configurable based on the physical attributes of the logged-in attendant, with attendant's arm's reach often being one factor in establishing the area. For example, each attendant's record in the system may contain measurements corresponding to the employee's arm's length and/or reach. From this measurement, calculated against the belt speed and the location of an exception item on the belt, the system may notify the logged-in attendant appropriately when the exception item can first be reached. For example, even though the scan portal may indicate that a certain item is an exception very early on when it is first scanned on the consumer's side of the portal, the system may wait to notify the attendant at a point when attendant can reach it. In this example, the size of the exception pickup area may vary depending on the logged-in attendant's ability to reach with ease.

Consumer Guidance Module

In another embodiment, the checkout system may include a consumer guidance projection module. Reports indicate that ASD systems may scan at potential rates of 100 items per minute, amplifying frustrations that may be felt by both consumer and attendant.

For such a system to meet the requirement of speed, accuracy and productivity, it is desirable for both the consumer and attendant to work in a coordinated fashion with one another, and ideally, with the automated scanning device and object recognition system. Since the consumer is not an employee and is not trained in the art of working with automated scanning and with object recognition systems, his or her understanding is often the weak link in this coordination. Applicant's consumer guidance system provides the consumer information in a timely, simple and convenient manner, which will allow the checkout process to flow correctly and proceed faster, while still providing accuracy.

In one example, as in FIGS. 10A through 10D, the guidance module uses a digital projector or equivalent 162 directs the consumer to focus on the loading of merchandise onto a loading area, such as a conveyor belt. Specifically, the system 162 will display instructions using various symbols and words, onto the conveyor belt at the unloading area indicating when each item can be placed on the conveyor belt and/or where they should be placed. In this way, each item can be placed on the conveyor belt to achieve the highest available ring up rate, while avoiding mistakes that can occur by improper spacing of the items. Proper item placement on the conveyor belt becomes even more important with implementation of ASD technologies, to allow the scanners (and cameras) a good view of the items as it passes.

The module may also display messages to the consumer, providing corrective guidance. For example, the module can display a message if the system detects items have been placed too close together or detects that the consumer has stacked one or more items one on top of another. Additionally, the module may be configured to allow the attendant to display instructions directly onto the belt. In this case, the attendant can enter system commands by way of voice, gesture, touch screen or keyboard. The module also may display the costs of items as they are transacted with the system. A running subtotal and tax also may be display along with other information, such as a real-time produce scale weight.

Traditionally, the moving surface of the conveyor belt, used for the purpose of transporting items from an offload location to another location for scanning and bagging, has been viewed and used only as a transport type of service device. Applicant's invention allows this surface to now also be used as a projection surface for providing information to consumers, particularly in a fast-paced transaction.

In one example, the consumer guidance module may replace the more traditional consumer LCD display, thereby reducing the overall complexity of the system's extended physical components. Avoiding the need for a physical LCD for a consumer display increases the visual aesthetics at the front end by removing unnecessary visual obstacles from the visual plane. Furthermore, LCD's used for consumer displays, while meant to display information for the consumer in the current transaction, are visible to all other consumers waiting in line to be checked out. This scenario is problematic for several reasons, not the least of which is a visually cluttered front end. Additionally, the projection onto the conveyor belt of instructions and other consumer-facing information, such as item prices, item weights, and discounts, provides an additional and welcome dimension of privacy for the consumer because it removes the content from the direct line of sight of consumers other than the one in the current transaction. This new level of transactional anonymity may particularly appeal to consumers participating in government-funded programs such as WIC (Women, Infants, and Children). One of the express written goals of the WIC program is to protect the dignity of WIC participants by making WIC transactions as anonymous as possible.

The consumer guidance module provides the added benefit of decreasing the wear and tear on the checkout component, which can shorten the component's life span and lead to more frequent repairs and replacements. Longer life span and reduced repairs ultimately results in a greater overall system cost savings by extending the life of the system's most significant and expensive moving component. The guidance provided by the system 162 can encourage the consumer to distribute the products and consequent wear and tear of the conveyor belt evenly across its full width. The guidance can move and change the item placement target zones via the projected image over time. Furthermore, the guidance may achieve this through incremental location changes to the projected item placement target zone over time in a manner that is subtle and which does not disrupt the consumer experience.

FIGS. 9A-D, 10 and 11 show one example of a consumer guidance module. Typically, the projector 192 is added to or built into a projection device extending over the unloading area or conveyor belt and projects an image downwardly. The image 94 may be located where the consumer is to place merchandise. In one example, (see FIG. 10B, 11) an infrared light source, with the infrared beam running through the center and perpendicular to the projected image is included. When the system displays instructions to the consumer to place the item on the belt and the consumer complies, the beam is broken 274, indicating electronically to the system that the consumer has placed the item on the belt at which point the system can display to the consumer further instructions, symbols or directions, thus allowing the system to work in an optimized and interactive fashion 276. Furthermore, the system may display the running subtotal and tax as each item is scanned, as well as, information on each item, such as price, as each item is scanned.

In one example, where the guidance system is used in with a scan portal, the projector may be oriented directly above the conveyor belt on the portal's entry arch 134a, creating a portal area 134c. The projector may be encased in a shell that mounts onto the top of the scan portal, and which is aesthetically and physically consistent with the scan portal itself.

The guidance projection module may also be placed in differing locations. Multiple projectors may be used. The projector may also include a pan, tilt or zoom capability. The system may include an image rotation and resizing ability. Additionally, there may be an image skewing ability for low visual perspective (for example, wheelchair-bound consumers). In some instances, the guidance module will include integrated audio and/or user interactivity with the projected image. The image may be projected onto other surfaces. The capability to cast a moving projection alongside (or on top of) an item based on item location and conveyor belt speed may be included. The projector may display an image from below the conveyor belt or display surface.

Various technologies can be used for the projector, such as a scanning laser, LCD, LCOS, DLP, or projected digital image such as a digital projector. In some cases analog projectors may be useful.

The consumer guidance module may be integrated with traditional attended checkout, self-checkout, scan portal environments and pay stations. The guidance system may be an attendant-side function and may be used in conjunction with the voice command and/or gestural command module.

Figure 10A:
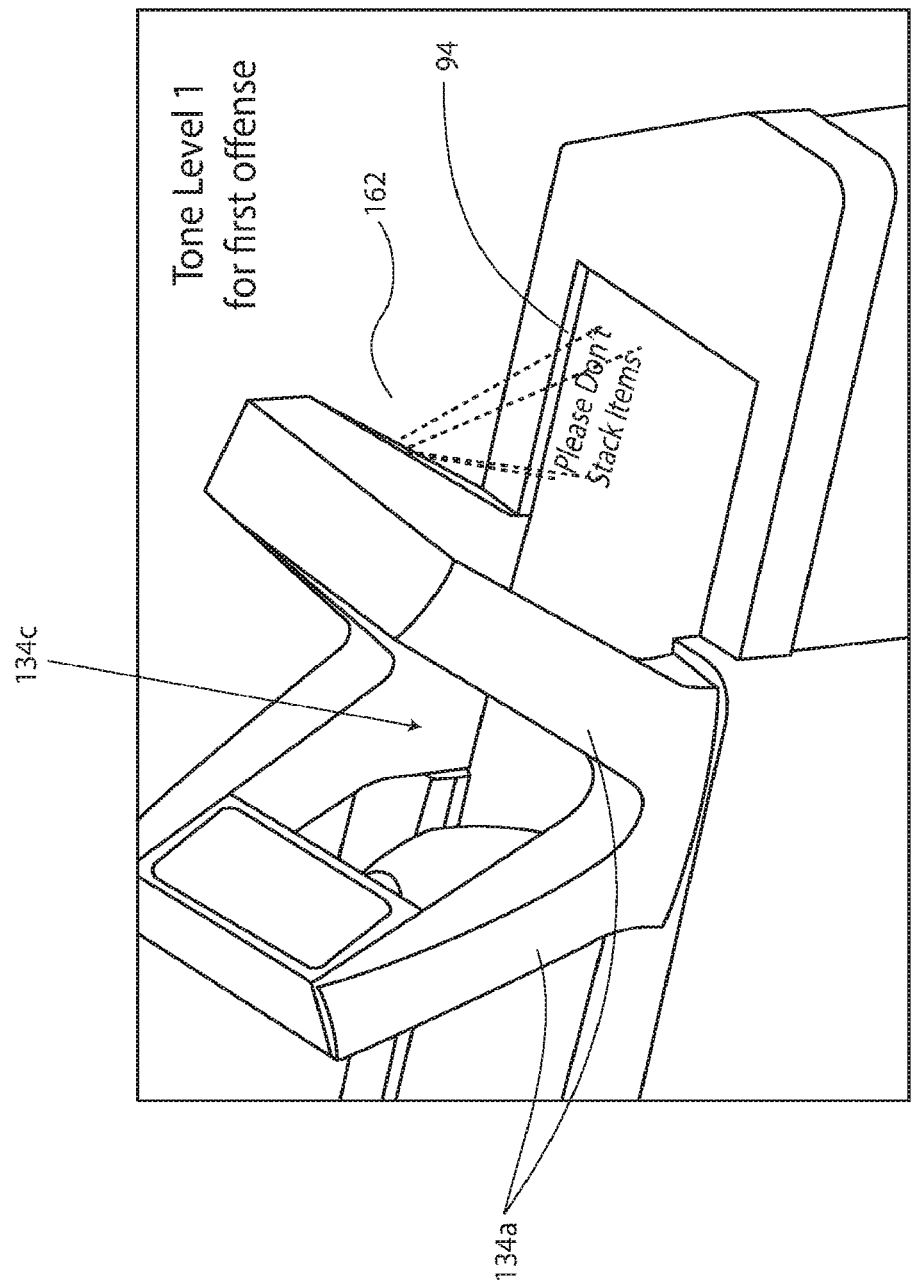
FIGS. 10A-D show another example of the customer guidance system of FIG. 8A-D.
Figure 10B:
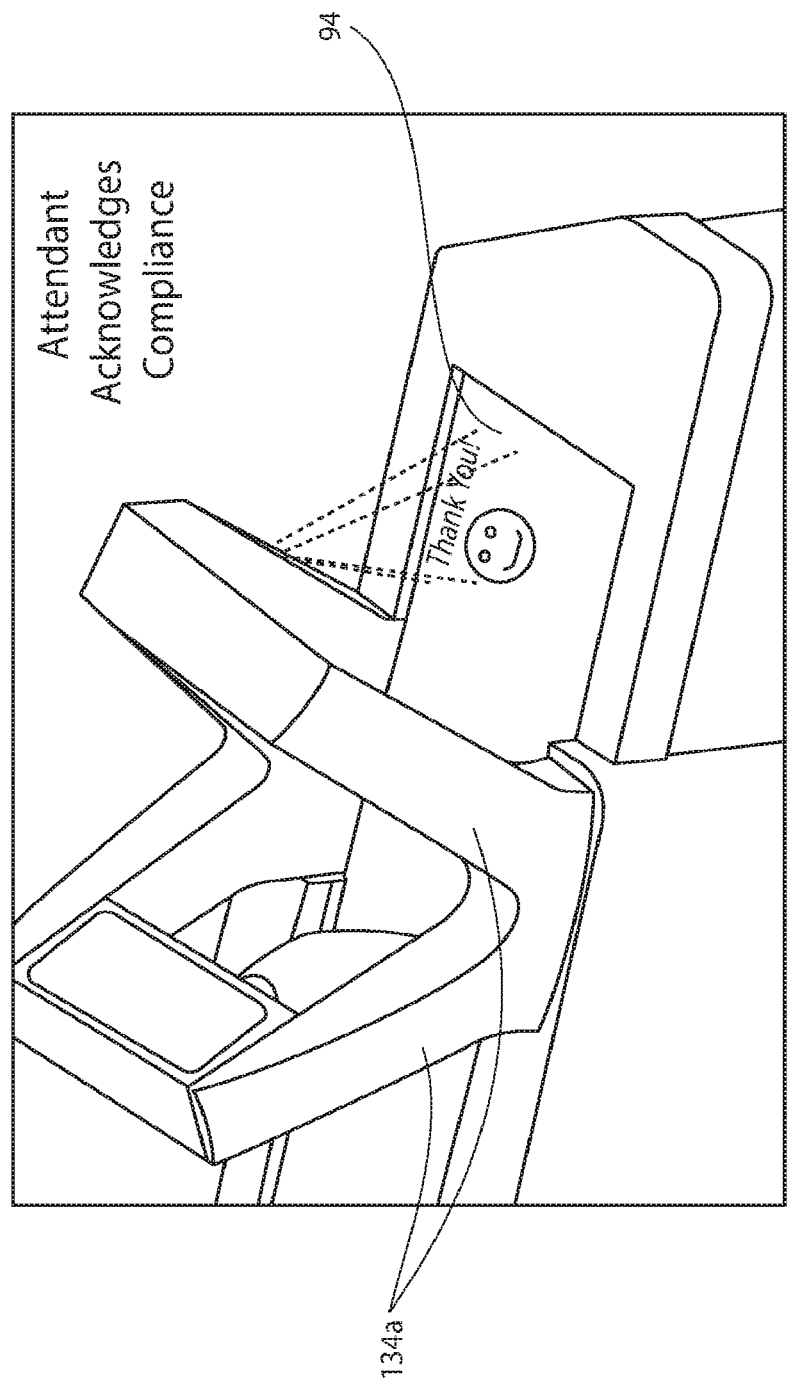
Figure 10D:
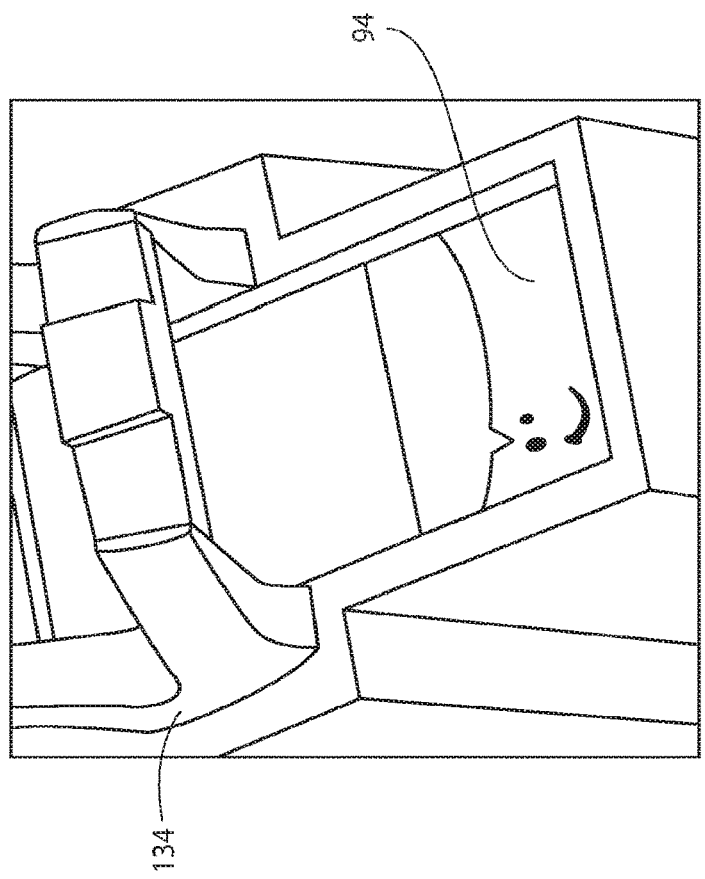
Figure 10C:
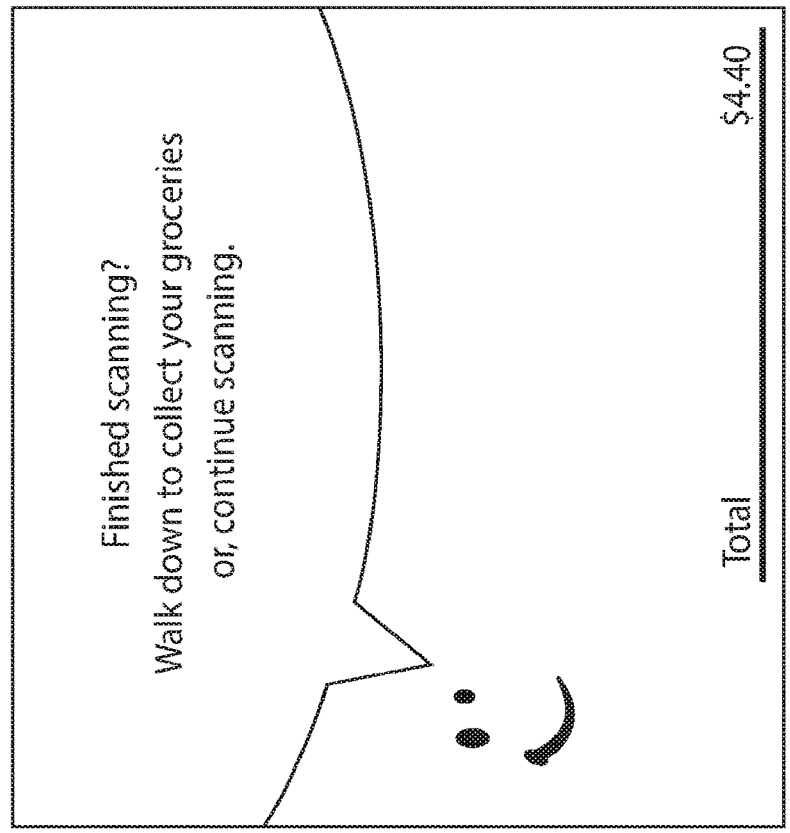
Figure 11:
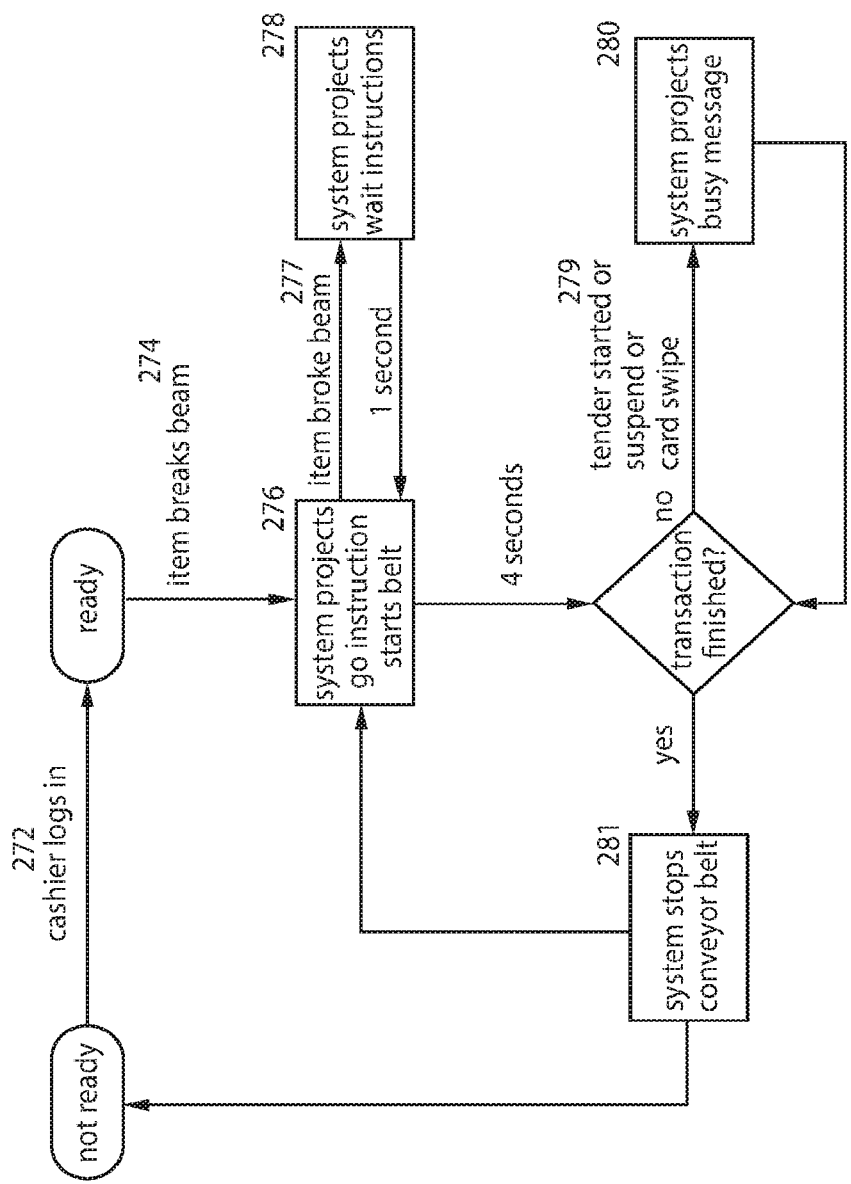
FIG. 11 is a flow chart of an example hybrid checkout transaction including projected consumer guidance.

As seen in FIGS. 10A and 10B, the projected content may be dynamically generated based on rules and settings determined by the merchant. The module can be configured to learn over the course of a single transaction that the consumer is either obeying or disobeying projected instructions. The system may dynamically change the content of the projected message based on whether or not the consumer is complying with the instructions. The toning up or down of the of instructional messages is configurable by the merchant, but is not limited to, 1) animating the projected message with more movement with each subsequent violation, 2) using more intense colors, and/or 3) using more aggressive typefaces and/or graphics. Toning down the intensity of the message, such as the "Don't Stack Items" message includes, but is not limited to, the system learning over the course of many transactions that the consumer is either 1) obeying or 2) disobeying the projected instructions and tones up or down the intensity of the projected message based on rules and setting pre-configured by the merchant.

The system may additionally be adapted to dynamically change the location, orientation and/or size of the projected image.

In operation, the check-out system may detect an approaching customer, by example, by proximity sensor or alert by an attendant. As a result, the system may start a conveyor belt moving. An image/text may be generated through the guidance module instructing the consumer as to how to proceed with the transaction. As the transaction progresses, the system may detect exceptions and the module may make projections in response based upon pre-configured settings. Alternatively, the attendant may direct the projections based upon exceptions showing up in the AWS display 188 or earphones 166.

The messages may be configured to ramp up in tone or down based on repeated behaviors in a single transaction, such as, stacking items more than three times when loading items. Alternatively, the system may detect a history of behaviors associated with a particular customer, for example, by way of ID bar code scan, phone number entry, biometrics and/or any other customer identification method.

The guidance projection module may also be used to provide customers with other types of information in addition to directional information. For example, the system may detect the scan speed of the consumer transaction for display. In some instances, the consumer's scan speed may be compared to other consumers in a pre-selected time period and that comparison displayed to the consumer. For example, the message, "Your scan speed is in the $20^{th}$ percentile of all consumers this month" may be displayed. Advertisements and/or coupons may also be projected for customers at the checkout. These types of projected items may be tailored to the consumer's transactional history. These types of projections may be interactive.

Multiple Items Sharing Bar Codes

Often times, exceptions occur at no fault of the customer but due to malfunctions and/or peculiarities associated with the labeling and identifications found on the items for purchase. Automated scanning, as done in a scan portal or scan tunnel, currently cannot automate the process of selecting the correct item when two different cost items share the same bar code ID or when there are two or more different bar codes on the same item. The first scenario exists when items are bundled by the store operator or by the supplier (wholesaler). For example, when a beverage is sold as a single item, a bundle of six, a 12-pack, or a case of 24, each uses the same bar code. In traditional point of sale scenario, the system detects that there are multiple (or "alternate") items associated with the same bar code. Therefore, when such a bar code is scanned, the system displays a menu containing, in this example, 1) a single, 2) a 6-pack, 3) a 12-pack, and 4) a 24-pack case. From this menu the cashier chooses the appropriate packaged quantity, thereby telling the system which quantity of beverages to ring into the transaction. The system will then apply any quantity-based discounts to reflect the lower pricing associated with higher quantities of units purchased. Therefore, the system includes a scanned item verification mode.

In the second scenario, an item may have two or more different bar codes, both of which get scanned when they pass through the automated scanning device (scan portal). This scenario, for example, occurs when a supplier packages a quantity of individual item units with bar code "A" together in a case package using clear plastic packaging. The supplier also puts a different bar code "B" on the outside of the plastic case packaging to serve as the item ID for the case package. The system is configured to recognize each of the two different bar codes as valid item IDs within the system, but for different items, so it does not know which one to insert into the transaction upon detecting them both via a scan.

In the second scenario, it is also possible that one or more of the scanned bar codes are associated with valid items while others are not linked to a valid item in the system. An aspect of automated scanning is to dramatically speed up checkout times for consumers and to reduce or eliminate cashier workloads. Forcing a cashier to make manual selections from a menu to resolve the bar code ID conflicts as described above is cost productive to this aspect of automated scanning.

When one bar code is associated with more than one item, the system may be activated to engage in a self-learning scenario by using data relationships for the system to detect when an item, which shares a bar code with two or more other items, has been scanned by the automated scanning device. In addition to scanning the bar code, the scan portal obtains other information about the scanned item, such as volume or image. Once detected, the system may present the customer, cashier or attendant a selection list on a display, which lists the various items associated with the single detected bar code, for example as an exception. The customer, cashier or attendant may select from this list the actual item scanned, the system then matches the selected item to the corresponding volume and or image data collected from the automated scanning device and the system stores this volume and/or image information within the relational database linked to the selected item.

When the automated scanning device indicates to the system that multiple valid bar codes have been detected on a single item, the system may similarly present the customer, cashier or attendant a selection list on a display, listing the various items associated with each detected bar code. The customer, cashier or attendant will select from this list the actual item scanned, the system would then match the selected item to the corresponding volume and or image data collected from the automated scanning device and the system would store this volume and or image information within the relational database linked to the selected item.

Learned Identifications for Building Item Database

The system is preferably configured to gather ranges of learned associated volumes and/or image recognition data digitally and will store such data, until a set of values for the associated item are within a set margin of error, deleting those values outside of this margin for any range. For example, five incidences have been recorded for a given range within the set margin of error, the associated item is flagged as having a "learned selection" status by the system. An item already flagged as learned can begin learning a new range.

By using data relationships, the system detects when, in the scenarios above, items have been scanned by the automated scanning device and also detect if the associated item has any associated learned ranges. If the scanned item has existing learned ranges, the system will compare the scanned item's volume or image data, converted to a digital number, against the learned values. If the two values are within the set excepted margin of error for any range, the system will select the appropriate item. If the values are not within a learned range, then self-learning will become active for the new possible range.

When the automatic scanning device indicates that it has scanned multiple bar codes for a single item but the system can only find one valid bar code, self learning by the system may occur. A valid bar code is defined as one that is linked to an associated item within the system's relational database. The system will go into self learning mode for a single bar code and will drop the additional unknown bar codes. If the single bar code matches an existing range, the system will ring the transaction using the valid ID with no user intervention required.

In the scenarios above when the scan portal detects exceptions, the system may alert and prompt the employee attendant/cashier/customer by way of video or voice for the correct selection to be made, for example, by way of touch screen input, keyboard input, voice command, interactive prompt or gestural command. The system may automatically run statistical sampling in order to insure that the learned selection status is current and accurate. From the learning mode, the system may associate a recognition parameter for an item with the one or more identifications recognized in the scan of the item and select the correct item to be added to the transaction based on that comparison.

Auto-Generated Weighted Items Menu and Scale Awareness

A specific learned identification, as discussed above, may be the weight associated with a particular item, such as produce. A weight profile may be developed for weighed items over time. Often at checkout, however, a cashier is required to weigh particular items that are selected from the checkout system from a menu screen. The cashier typically selects a menu button prior to selecting the specific produce item from the menu. These menus are set up by building a weighted item menu manually by creating an item listing within the menu, then assigning an item group and then including an item group within the menu. A checkout process that reduces even one step during a checkout transaction can greatly increase the speed of checkout for customers. Embodiments of applicant's invention allows the cashier/attendant to skip the requirement of first selecting a menu followed by a second step of selecting the item from that menu.

The auto-generated weighted items module senses when an item is placed on the scale and automatically displays a new menu, the Weighted Item Menu (WIM). In order to prevent false scale readings, such as an item skimming the scale, the settings may be set to only recognize a settled weight. When the system displays a WIM screen, the user/attendant selects the item from the menu. The system closes the menu and calculates the item produce using the settled scale weight and the data for the item is placed into the transaction.

Paystation Customer Item Controls

When customers checkout and then are directed to a paystation in order to make payment and complete the transaction, they have left the area where items are added to the transaction. However, stores may want to provide advertisement and impulse offerings at the paystation area. Additionally, it is possible that the customer may want to add something to the transaction that he or she forgot to the transaction or decide to remove an item from the transaction. If the customer has to return to the transaction area and redo the transaction, then add-on purchases by consumers may be discouraged. Applicant has developed the ability for the consumer to add additional items, such as impulse items strategically located around the pay-station, by way of scanning, object recognition, RFID or manual entry, to a specific transaction at a remote consumer self pay-station. This capability allows customers to include add-on items via a revisions module at the paystation, which is separate from where the items being purchased were originally scanned or manually entered into the transaction, but within the same store location. Consumers are also able to remove an item from the transaction without the need to repeat the item entry for the transaction either with or without attendant being alerted and with or without attendant guidance and approval. For example, store personnel may remotely authorize removal of an item located within a transaction, which is currently in the process of being completed by the customer from a pay-station. The remote device used by the personnel could be, for example, a hand held device or computer connected to the store network.

Additionally, customers may want to apply or redeem store coupons, loyalty rewards and vendor coupons in a specific transaction at a remote consumer self pay-station. Applicant's ADS system allows customers to redeem coupons via the revisions module. In one example, the consumer is able to associate their store ID to an existing transaction from a remote consumer self pay-station, and through this association receives associated discounts, rewards or assigned preferences. In another example, instead of using a scanner at the pay-station to scan vendor coupons, which may require the consumer to place such coupons into a coupon slot after they are scanned, a special mechanical coupon device may be used, which requires the customer to insert the coupon into the device, where the device scans the coupon. If the device successfully scans the coupon and then matches the coupon against the transaction, the device would also store the coupon for later pickup by store personnel. If the device cannot scan the coupon or a successfully scanned coupon is rejected because it does not meet the vendor or store rules, the device provides the coupon back to the customer and provides details as to the problem.

Mobile Scanning Device and Paystation Checkout Option

In another embodiment, the ASD could be replaced by a mobile scanning device, by which the consumer could use such a device to scan items as they shop, thereby eliminating the need for Automated Scanning Device to scan the items and the need for the attendant to bag items or do manual transaction inputs. In this scenario, the consumer scans each item, using the device, then proceeds directly to the pay station to complete the transaction. The mobile device could be provided by the retailer for use by the consumer or by could be a common device carried by consumers, such as an Apple or Droid Smart Phone and/or tablet device. The hybrid checkout transaction would proceed otherwise as is discussed herein.

Synchronous Scanning

Figure 13:
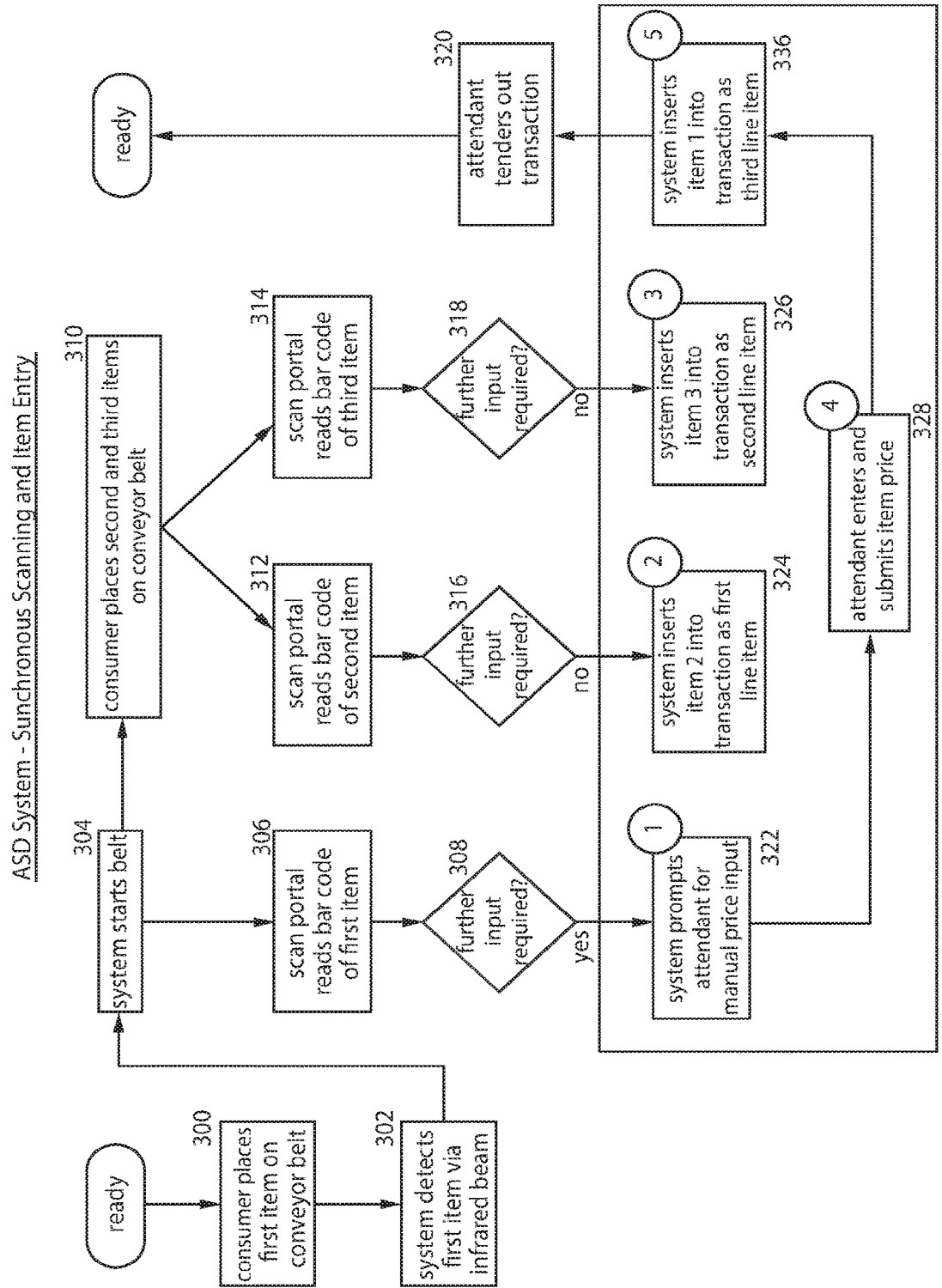
FIG. 13 is a flow chart of an example of a hybrid checkout transaction including synchronous scanning.

An improvement to allow faster checkout transactions is to allow the attendant to scan or ring in items, for example exceptions items, at the same time that the scan portal scans items (See FIG. 13). This allows the attendant the freedom to scan/enter items that the portal cannot identify or that occur as exceptions while, at the same time, the portal is also scanning in the items it can identify. Both scan portal scanned items and attendant entered items will be associated with the transaction and added to the same transaction as they are entered. Synchronous scanning allows the exceptions processing and ASD scanned items to be added to the transaction in parallel. Otherwise, the transaction would occur serially as in traditional checkouts and hinder the speed of which hybrid checkout systems are capable of progressing. FIG. 13 illustrates one example of how synchronous scanning allows the transaction to proceed simultaneously with ASD scans and exceptions being handled at the same time.

Community Volumetric Data

As ASD systems are added to checkout environments, the user or store implementing the ASD system will face challenges associated with implementation. The store, for example, will be required to send every item in its inventory through the device in order to build within the system the volumetric data needed to identify and associate with items in a secure manner as the items move through the scanner during a transaction. Volumetric data includes item identifiers, including but not limited to, surface patterns, weight, volume, dimensions, coding, etc. Such a process has the prospect of being very extremely labor intensive and time consuming. Furthermore, the process would not account for items that come into the store's inventory after the initial volumetric data gathering session. Users would therefore be forced to run all new items through the ASD so that their associated information is added to the ASD inventory prior to the item being sold. Therefore, this complication not only adds time and complexity to the proper integration of ASD systems but also introduces unacceptable failure points to the ASD operation.

Figure 12:
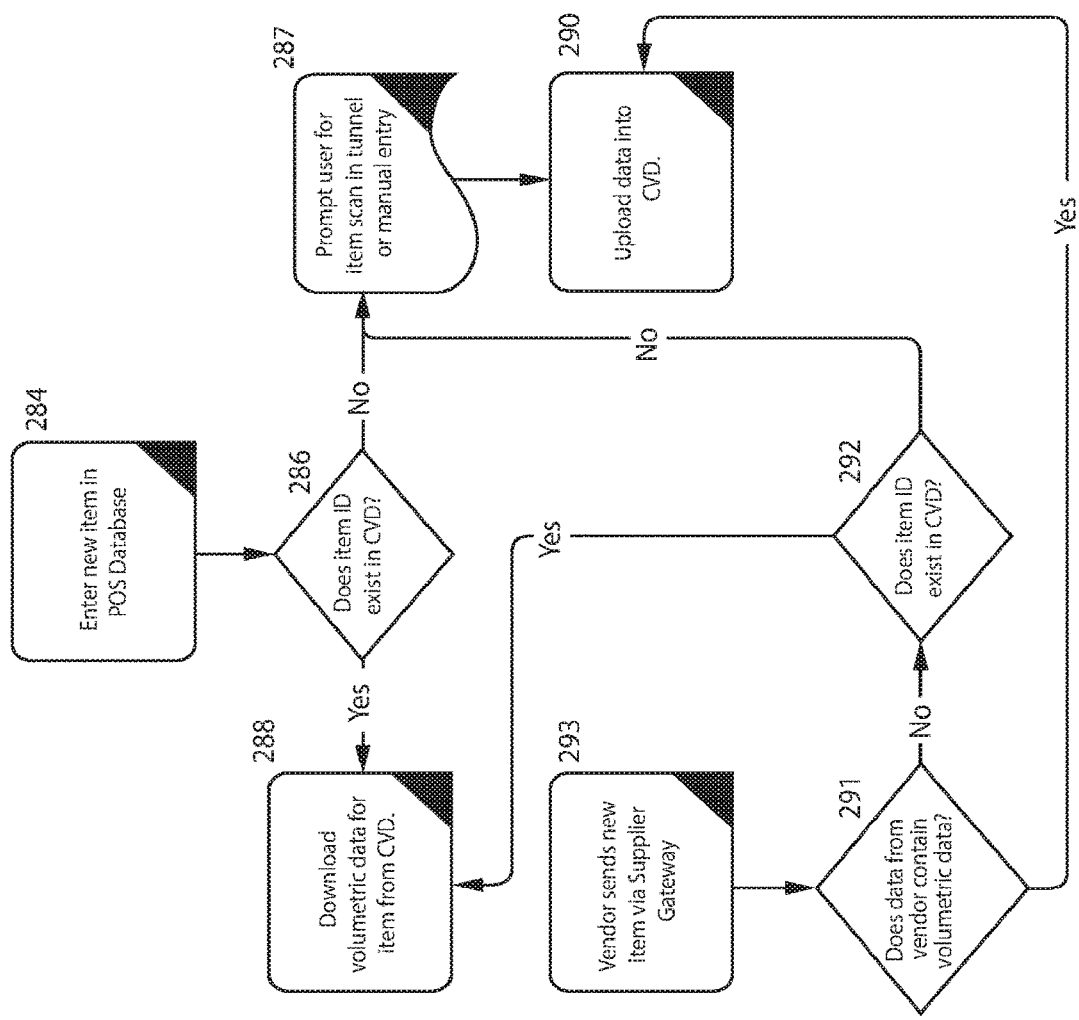
FIG. 12 is a flow chart of an example of a hybrid checkout transaction including automatic volumetric data update.

A community volumetric data option and an inventory maintenance module addresses this problem. A data repository of item inventory is created and maintained. When a merchant joins the community volumetric data repository, then their volumetric item data, typically without pricing or cost, is sent upstream to the communal server maintained repository. As seen in FIG. 12, the data is keyed, for example by, SKU, UPC and barcode identifiers. When a store location within the data sharing community adds a new item into their inventory, an inventory maintenance module will check to see if the data repository has volumetric information for the item being added 286. If so, that missing information is obtained from the repository 291, 293. As more and more merchants participate in the community volumetric data repository and add items into their databases, the repository also becomes more robust with the ability to, in turn, save an increasingly large amount of time and labor to merchants, who are spared having to manually recognize and enter new scanned items into the ASD inventory.

In one example, a vendor may provide volumetric data along with their electronic product catalogs to the repository so that as merchants add ASD environments, the vendor's inventory, along with product volumetric data may be downloaded from the repository.

While Applicant's disclosure may be directed to increased efficiency and speed when a scan tunnel is integrated into the checkout system, one skilled in the art will recognize that these improvements may be useful with or without the scan tunnel and as integrated into a traditional attended checkout, a traditional self-checkout and/or a scan tunnel and pay station environment. System and methods for improved checkout environments are also considered within the scope of the inventions disclosed.

As used in this application, the terms "component", "system", "interface" "mechanism", "module" and the like, are intended to refer to a computer and/or electronic-related entity, either hardware, software, software in execution, firmware, middle ware, microcode, and/or any suitable combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Moreover, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art. In addition, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Certain modifications and improvements will occur to those skilled in the art upon a reading of the foregoing description. It should be understood that all such modifications and improvements have been deleted herein for the sake of conciseness and readability but are properly within the scope of the following claims.

We claim:
1. A method for a checkout system comprising:
arranging a checkout station having a housing, a customer interface and a customer unloading station for touchlessly scanning items for purchase and providing touchless direction to a consumer,
locating an attendant work station at one end in the housing,
placing a transport mechanism for transporting one or more items for purchase from the customer interface toward the attendant interface between the customer interface and the attendant interface,
communicating with a point-of-sale system having a microprocessor and memory operatively associated with one another to identify products being purchased, payments tendered therefor and to store transaction information locally at the checkout station or remotely from the checkout station,
programming the microprocessor with programming configured to allow an item to be touchlessly scanned by a product identification scanner,
associating a projection device with the checkout system, the projection device configured to direct a consumer remotely to focus on an area of the transport mechanism at the customer interface where a consumer information will be projected, and
providing a consumer guidance projection module in communication with the projection device and also in communication with the point-of-sale system, the consumer guidance projection module configured to:
monitor an ongoing transaction,
determine a consumer information that would assist the ongoing transaction, develop a message for touchless projection based upon the ongoing transaction and the consumer information, signal the projection device to display the message to the consumer, alternate between different messages to facilitate the transaction.

2. The method of claim 1 wherein the checkout station is a self-checkout station.

3. The method of claim 2 including a portal scanner.

4. The method of claim 1 including a communication with an object recognition system in communication with the point-of-sale system and able to recognize items for purchase in the transaction and able to classify each item as added to a transaction item listing or as an exception item unable to be added to a transaction item listing and instead is added to an exceptions listing.

5. The method of claim 4 including configuring an exceptions management module to present items added to the exceptions listing to an attendant for processing.

6. The method of claim 5 wherein the attendant work station includes providing an attendant display with access to an attendant command module, the attendant command module including a toggle command, wherein the attendant may switch between a point-of-sale display and an exceptions display at the attendant work station.

7. The method of claim 1 wherein the consumer information includes providing a customer loading instruction such that the message instructs the consumer on how to distribute the items for purchase at the customer interface.

8. The method of claim 1 wherein the consumer information provides a corrective guidance message.

9. The method of claim 8 providing the corrective guidance message from an attendant.

10. The method of claim 1 wherein the consumer information provides a financial information about the transaction.

11. The method of claim 10 including providing a discount information in the consumer information.

12. The method of claim 1 wherein the consumer information includes projecting an incremental location change to a projected item placement target zone.

13. The method of claim 1 including providing a feedback beam directed through a projection location, wherein a broken beam provides feedback to the consumer guidance projection module indicating that the consumer has complied with a message asking for a consumer response, and signaling for a new message to be generated.

14. The method of claim 1 including traversing a scan portal with a portal arch portion over the transport mechanism, the portal arch portion including the projector device so that the projection device is oriented above the transport mechanism.

15. The method of claim 14 including messaging the message results from a corrective action to prevent the same exceptions from occurring while processing a transaction.

16. A method for handling exceptions at a checkout apparatus comprising:

arranging a base having a customer interface, a scan tunnel and an attendant interface, the customer interface and attendant interface spaced apart by the scan tunnel, positioning a transport mechanism extending along a linear axis from the customer interface, through the scan tunnel and to the attendant interface so that a customer may load items for purchase on the base at the customer interface, the transport mechanism transports the loaded items through the scan tunnel to the attendant interface, the scan tunnel equipped with transducers to read information about the loaded items as they pass through the scan tunnel and deliver digital electronic signals indicating the read information to assist in touchlessly compiling a digital list of items the customer has chosen to purchase, providing an attendant workstation including a defined location for the attendant interface, the attendant workstation including access to a bagging station, an attendant computer, and a scanner, configuring an exceptions management module included on the attendant computer to present an exception to an attendant and to allow the attendant to resolve the exception that was detected as the items pass through the scan tunnel, and attaching a projector to the scan tunnel, wherein the projector includes a touchless projection aimed at the customer interface and is configured to direct the customers' focus toward a customer item loading area in the customer interface.

17. The method of claim 16 including straddling the transport mechanism with a frame associated with the scan tunnel and the projector is mounted to the frame over the transport mechanism.

18. The method of claim 17 including associating a digital projector with the frame.

19. The method of claim 18 including projecting a light downwardly in the customer interface, the projected light configured to display messages to the customer to facilitate customer use of the checkout apparatus.

20. The method as of claim 19 including displaying at the attendant interface, a digital display to the attendant in which exceptions to normal processing of the reading of information about the loaded items as they pass through the scan tunnel can be displayed to the attendant on the digital display, and the projection presents an information to the customer, the information being generated based upon the exceptions occurring as the items pass through the scan tunnel in order to prevent the further occurrence of similar exceptions.

* * * * *

UNITED STATES PATENT AND TRADEMARK OFFICE
CERTIFICATE OF CORRECTION

PATENT NO. : 11,138,584 B1
APPLICATION NO. : 16/992228
DATED : October 5, 2021
INVENTOR(S) : Peter Terry Catoe et al.

It is certified that error appears in the above-identified patent and that said Letters Patent is hereby corrected as shown below:

On the Title Page

Page 2, Column 1, Item (60) Related U.S. Application Data --Provisional application No. 61/751,603, filed on Jan. 11, 2013, provisional application No. 61/709,487, filed on Oct. 4, 2012.-- should read "Provisional application No. 61/751,602, filed on Jan. 11, 2013, provisional application No. 61/709,487, filed on Oct. 4, 2012."

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*